Nov. 14, 1950            N. B. COLEY            2,529,596
AIRPLANE APPROACH CONTROL SYSTEM
Filed June 24, 1948            9 Sheets-Sheet 1
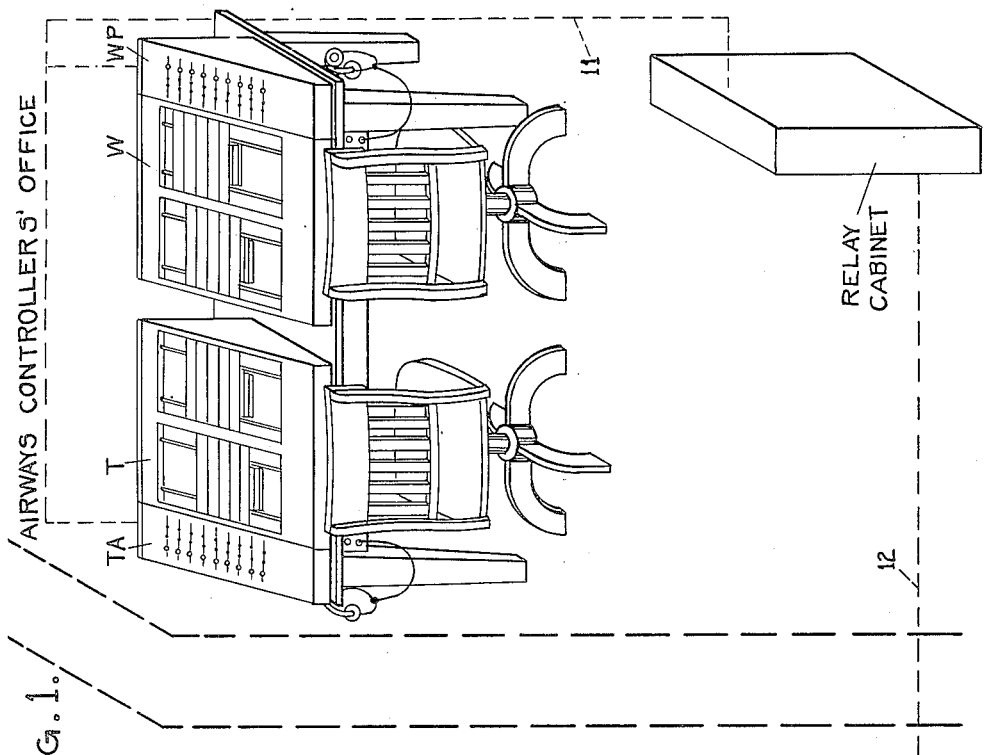
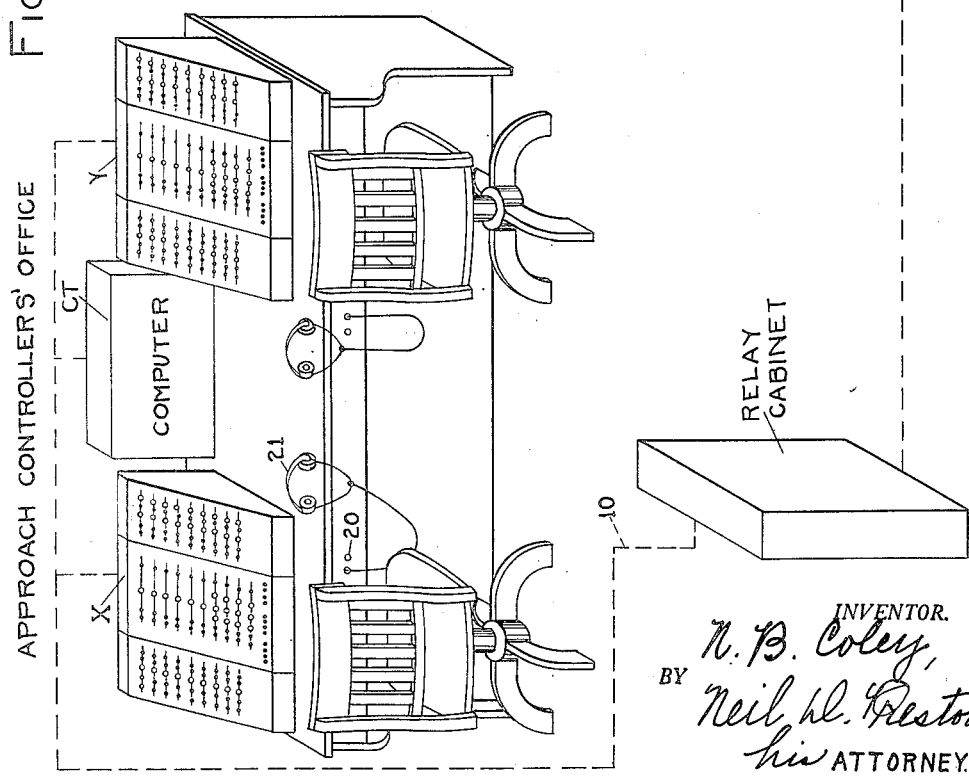
Fig. 1.
INVENTOR.
N. B. Coley,
BY Neil W. Preston,
his ATTORNEY.

Nov. 14, 1950  N. B. COLEY  2,529,596
AIRPLANE APPROACH CONTROL SYSTEM
Filed June 24, 1948  9 Sheets-Sheet 2
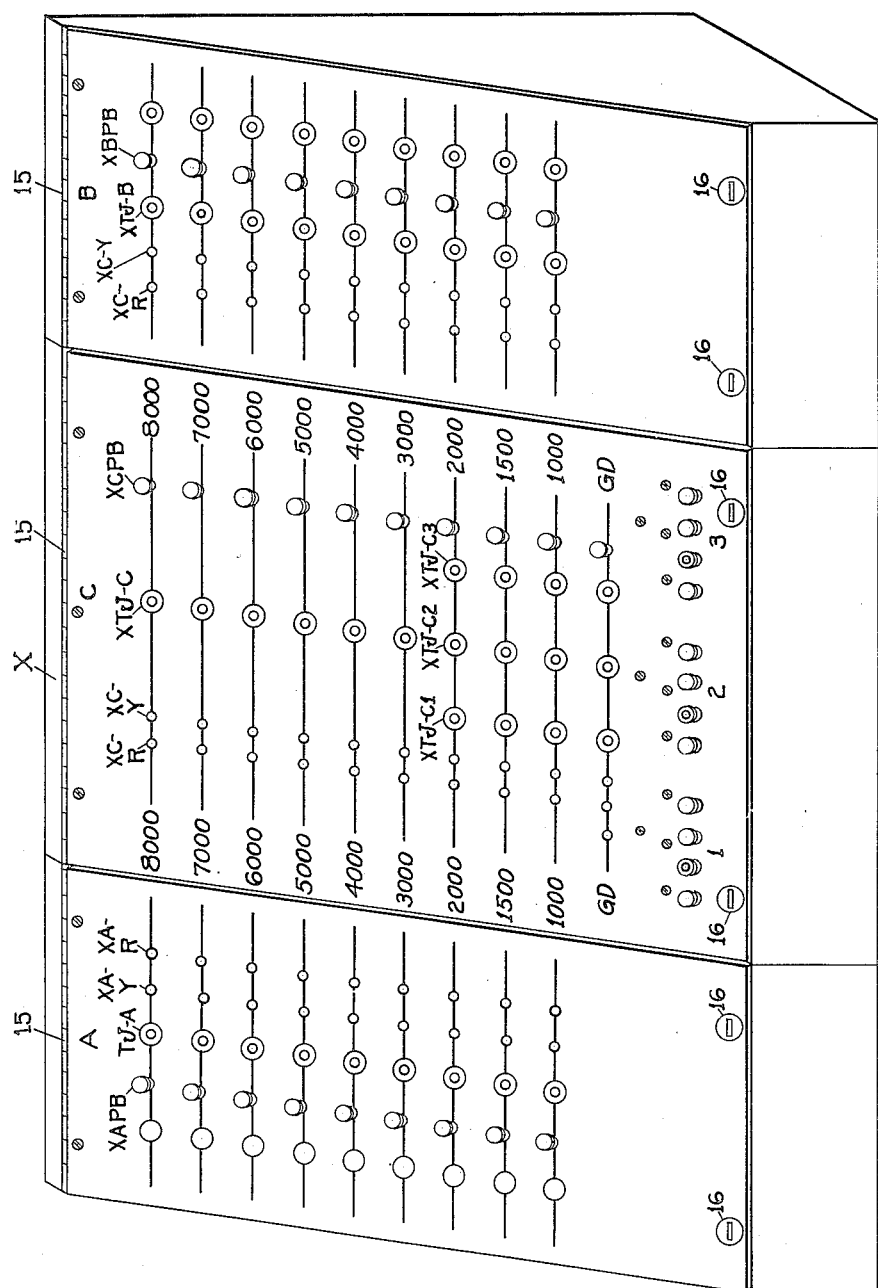
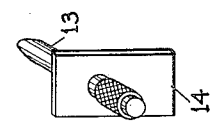
INVENTOR.
N. B. Coley,
BY Neil D. Preston,
his ATTORNEY.

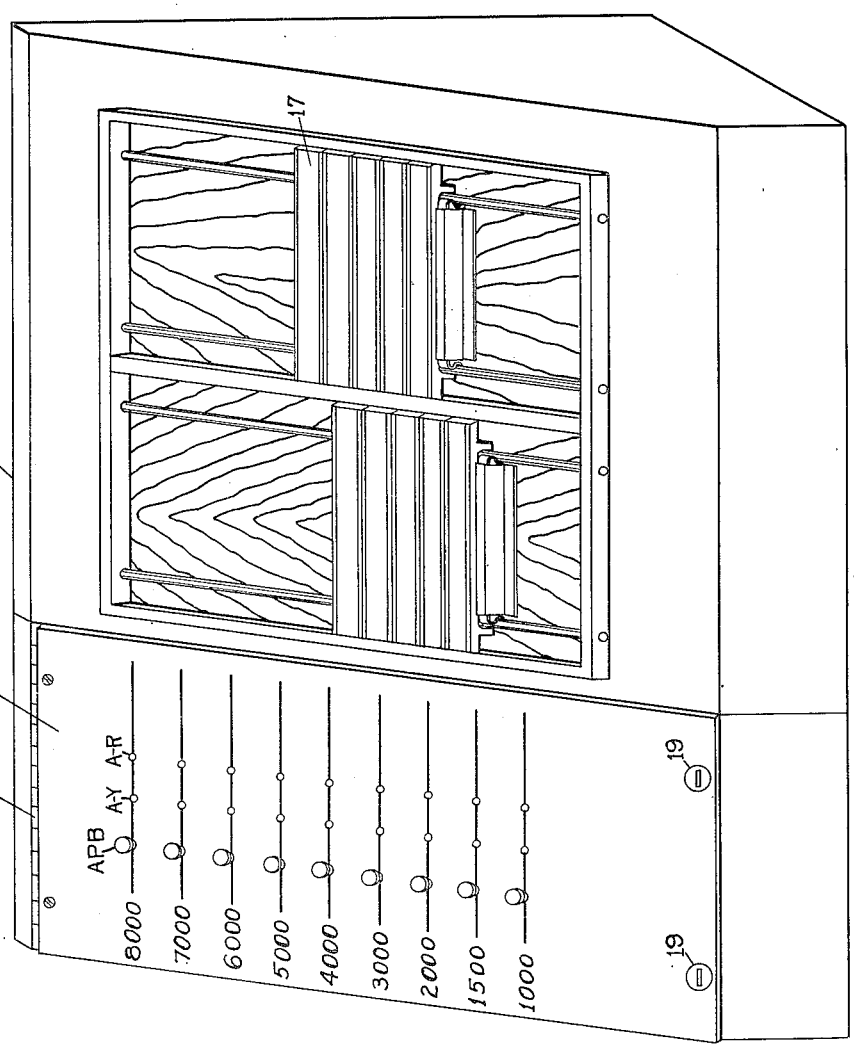

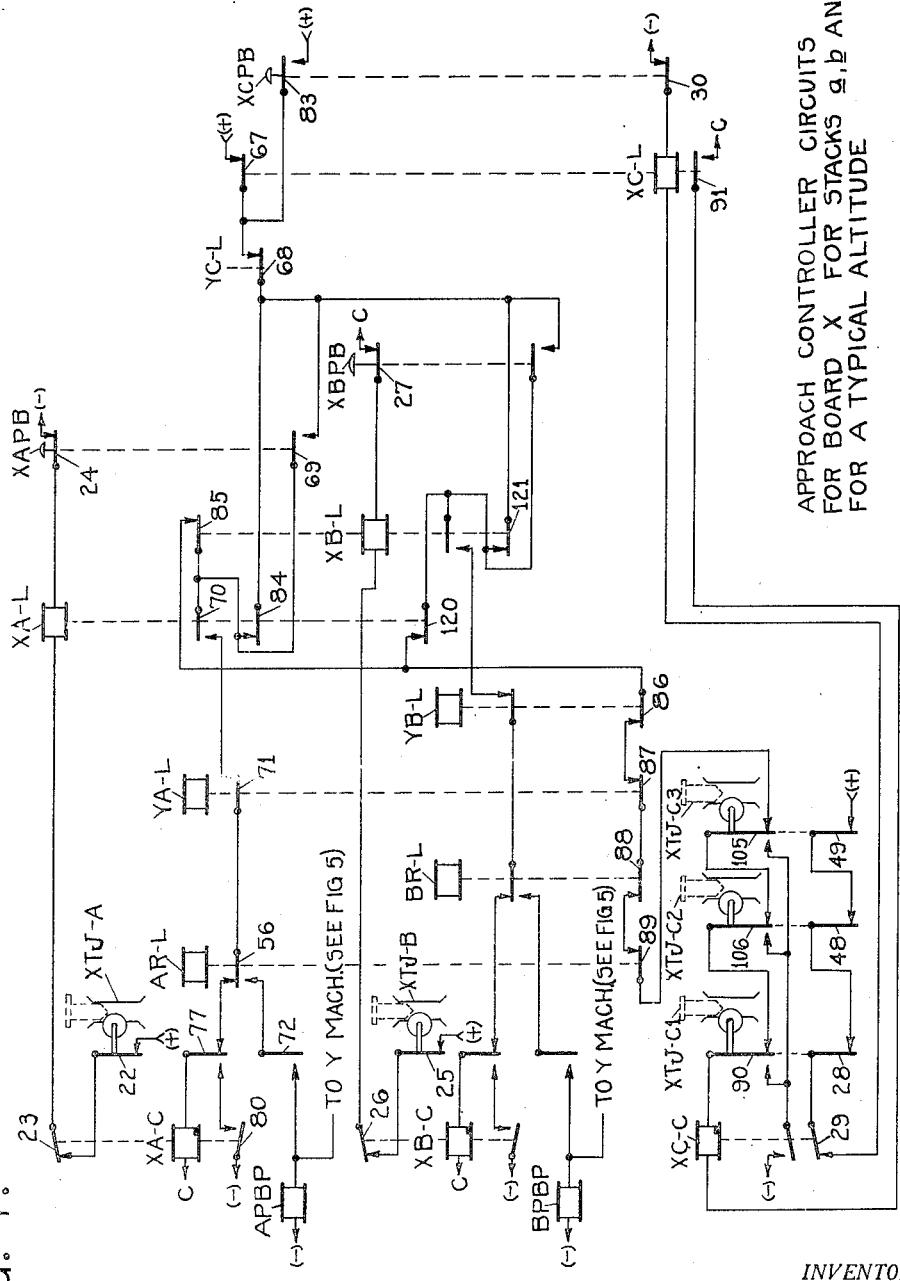

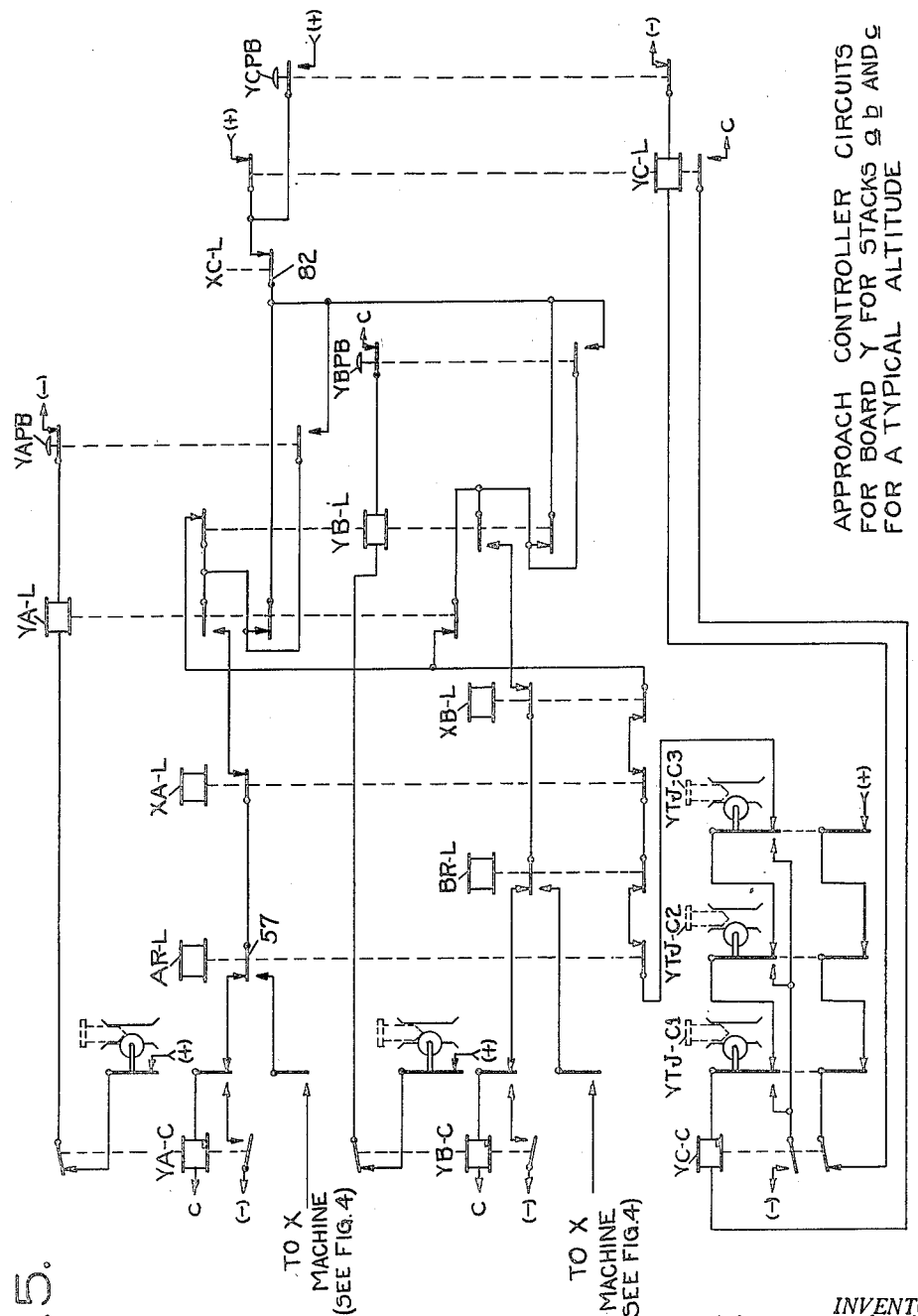

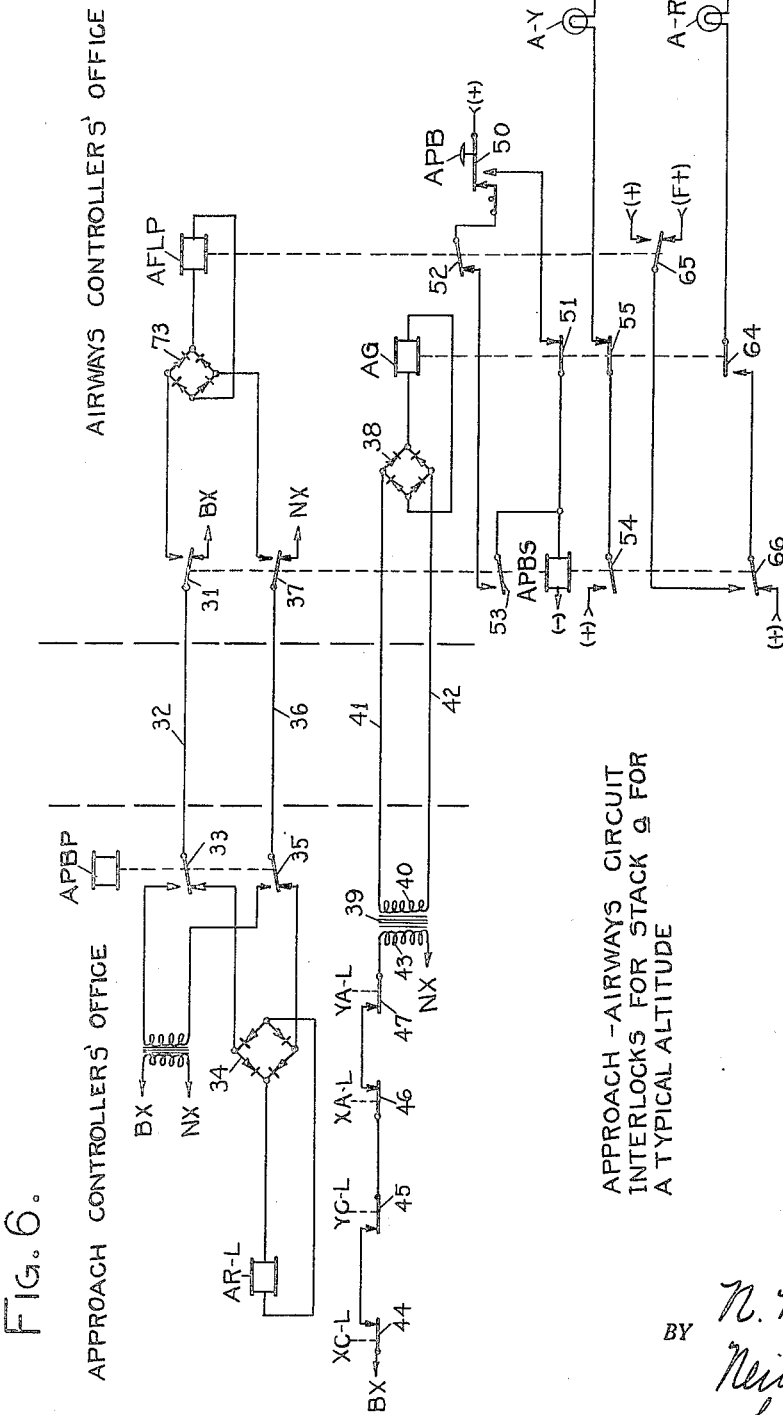

Nov. 14, 1950 N. B. COLEY 2,529,596
AIRPLANE APPROACH CONTROL SYSTEM
Filed June 24, 1948 9 Sheets-Sheet 7

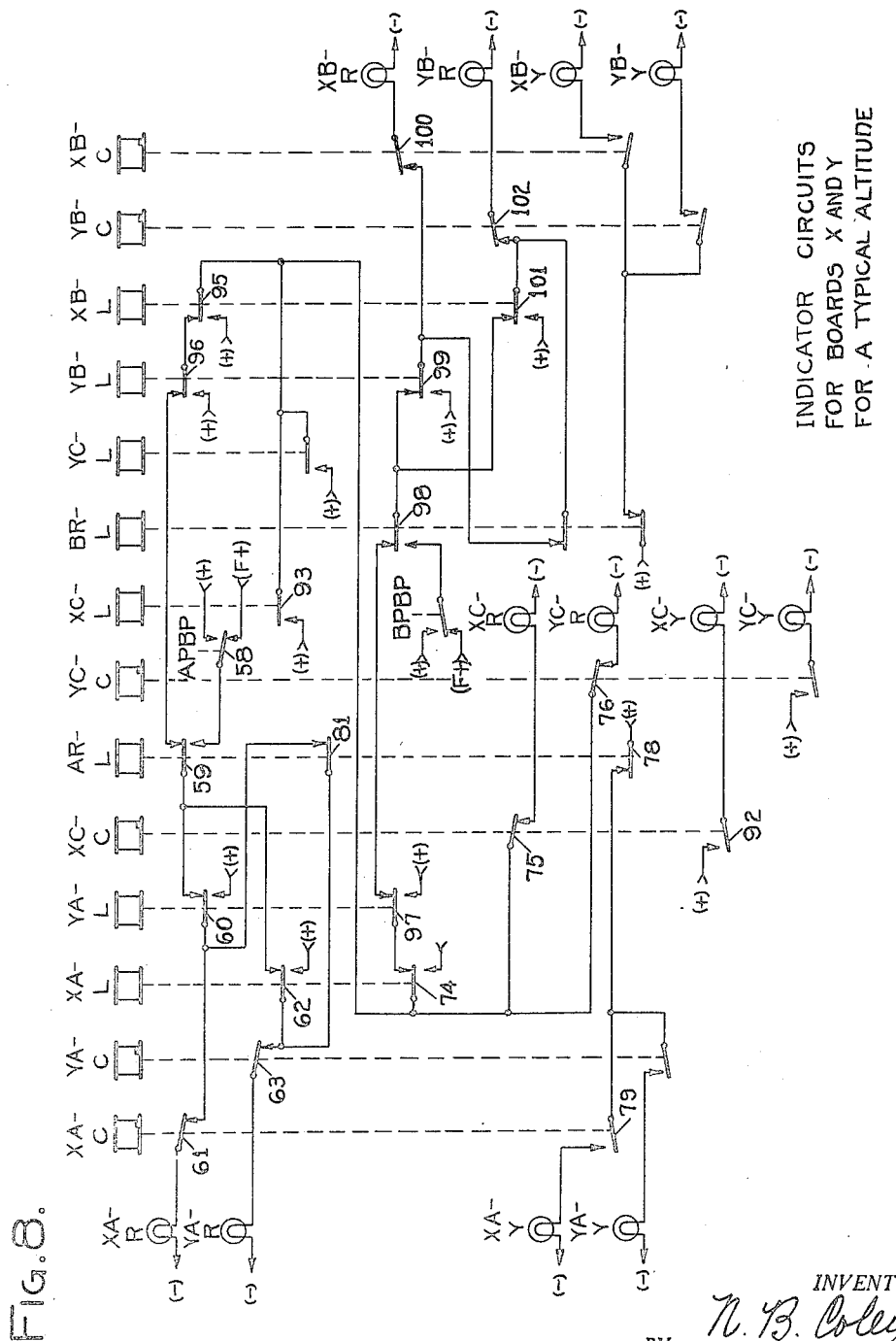

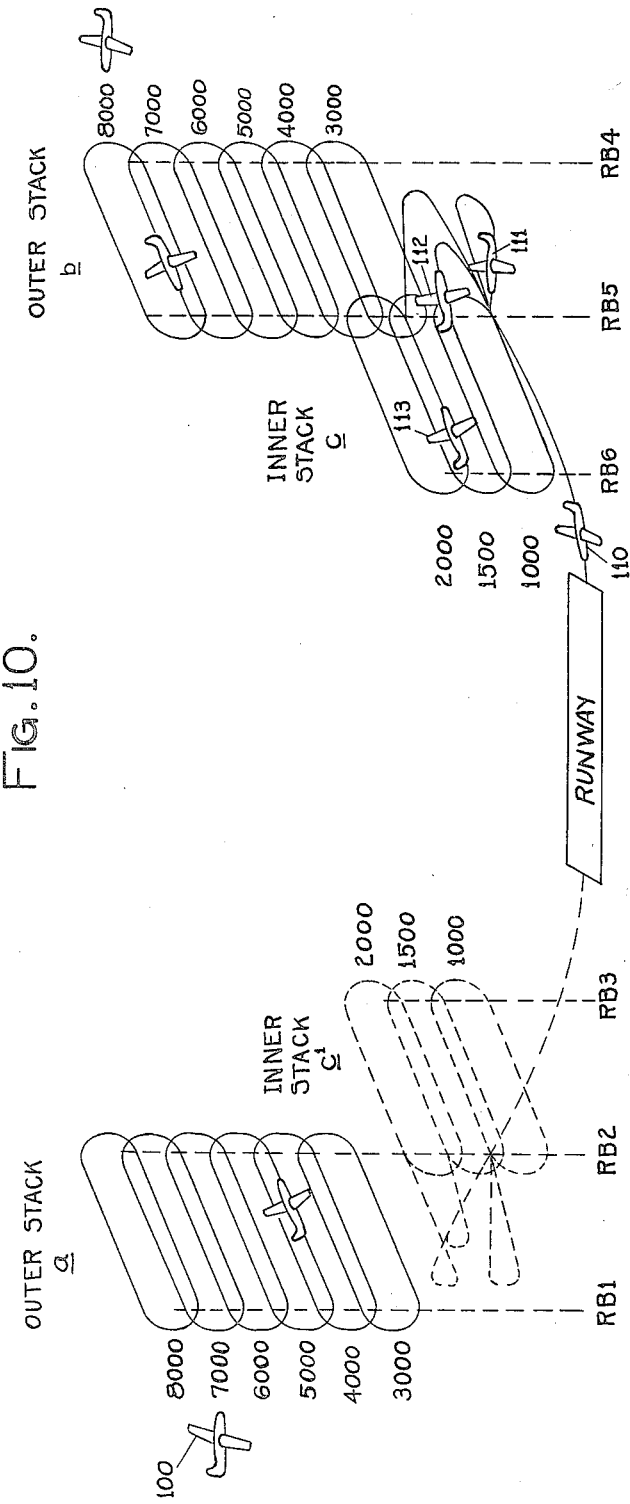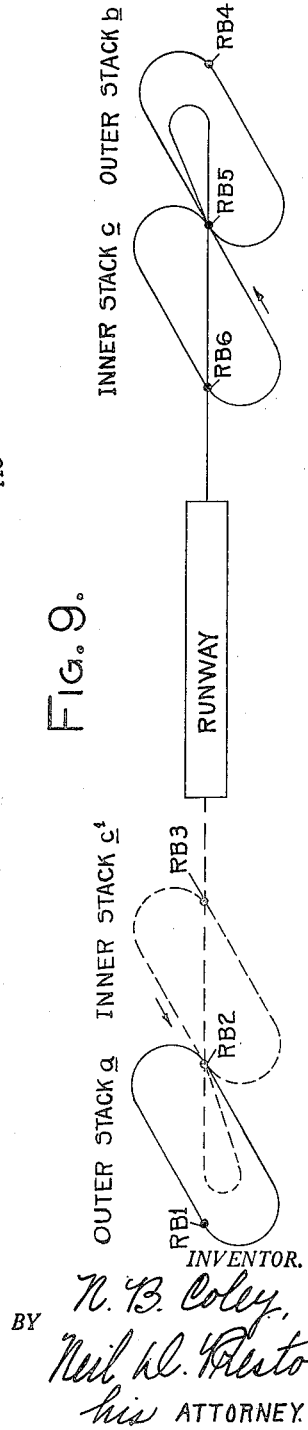

Patented Nov. 14, 1950

2,529,596

UNITED STATES PATENT OFFICE 2,529,596

AIRPLANE APPROACH CONTROL SYSTEM

Nelson B. Coley, Rochester, N. Y., assignor to General Railway Signal Company, Rochester, N. Y.

Application June 24, 1948, Serial No. 34,961

12 Claims. (Cl. 177—353)

This invention relates to approach control systems for airplanes, and it more particularly pertains to a system for the supervision of airplane flights at and in approach of an airport.

The present invention is to be considered as providing improvements in the approach control system disclosed in the patent to S. N. Wight et al., Patent No. 2,425,973, dated August 19, 1947. According to that patent a plurality of approach control boards are provided at an airport control tower, one board for each of a plurality of approach controllers, each board having control panels upon which are disposed respective control buttons, token jacks, and indicator lamps for each of the flight altitudes used in holding airplanes in respective holding stacks at or near an airport prior to their being landed. The buttons are used by the respective controllers for obtaining clearance indications and preempting flight altitudes at which respective airplanes are to be held, clearance being given on only one board for a given flight altitude of a given holding stack.

It is an object of the present invention to improve the circuit organization of the above described system, particularly relative to the interlock of circuits for clearance indications of respective adjoining holding stacks for the same altitude.

Another object of the present invention is to facilitate transfer of the supervision of respective airplane flights from an airways controller to an approach controller as the airplanes approach an airport. The airways controller supervises airplane flights along an airway to a holding stack in approach of an airport, while the approach controller supervises the respective landing maneuvers.

An object in facilitating the transfer of the supervision of respective airplane flights is to provide a control board at an airways controllers' office which may be remotely located from the approach controllers' office, such board being interlocked with the control boards used by the approach controllers so that only one of the controllers can obtain clearance for a given flight altitude in a given holding stack.

Another object of the present invention is to provide distinctive indications on both the airways and the approach controller's boards at respective stages from initiation to completion of the transfer of the supervision of each airplane flight from the airways to the approach controller.

Another object of the present invention is to employ a minimum number of control circuits extending between the approach controllers' office and the airways controllers' office as such offices may be remotely located from each other.

Other objects, purposes, and characteristic features of the present invention will be in part obvious from the accompanying drawings and in part pointed out as the description progresses.

In describing the invention in detail, reference is made to the accompanying drawings in which similar reference characters are used to designate corresponding parts throughout the several illustrations and in which:

Fig. 1 is a perspective view illustrating somewhat diagrammatically the system organization provided by the present invention for coordination between respective approach and airways controllers' offices;

Fig. 2 is an enlarged view of one of the approach controllers' control boards illustrated in Fig. 1;

Fig. 3 is an enlarged view of one of the airways controllers control boards illustrated in Fig. 1;

Fig. 4 is a diagram of the circuit organization for the control of certain lock and indication control relays provided for a typical flight altitude and associated with one of the approach controllers' boards;

Fig. 5 is a diagram of the circuit organization for the control of certain lock and indication control relays provided for a typical flight altitude and associated with another of the approach controllers' boards;

Fig. 6 illustrates the circuit organization provided for interlocking and the communication of indications between an approach controllers' office and an airways controllers' office for a typical flight altitude of one holding stack;

Fig. 8 illustrates a circuit organization for the control of indicator lamps of the approach controllers' boards for a typical flight altitude;

Fig. 9 illustrates diagrammatically by a plan view the organization of the respective holding stacks and holding loops employed in approach landing procedure;

Fig. 10 illustrates by a perspective diagram various flight altitudes of holding stacks and holding loops used in approach landing procedures; and, Fig. 11 shows in perspective a typical token used in identifying an airplane flight.

Figure 7:
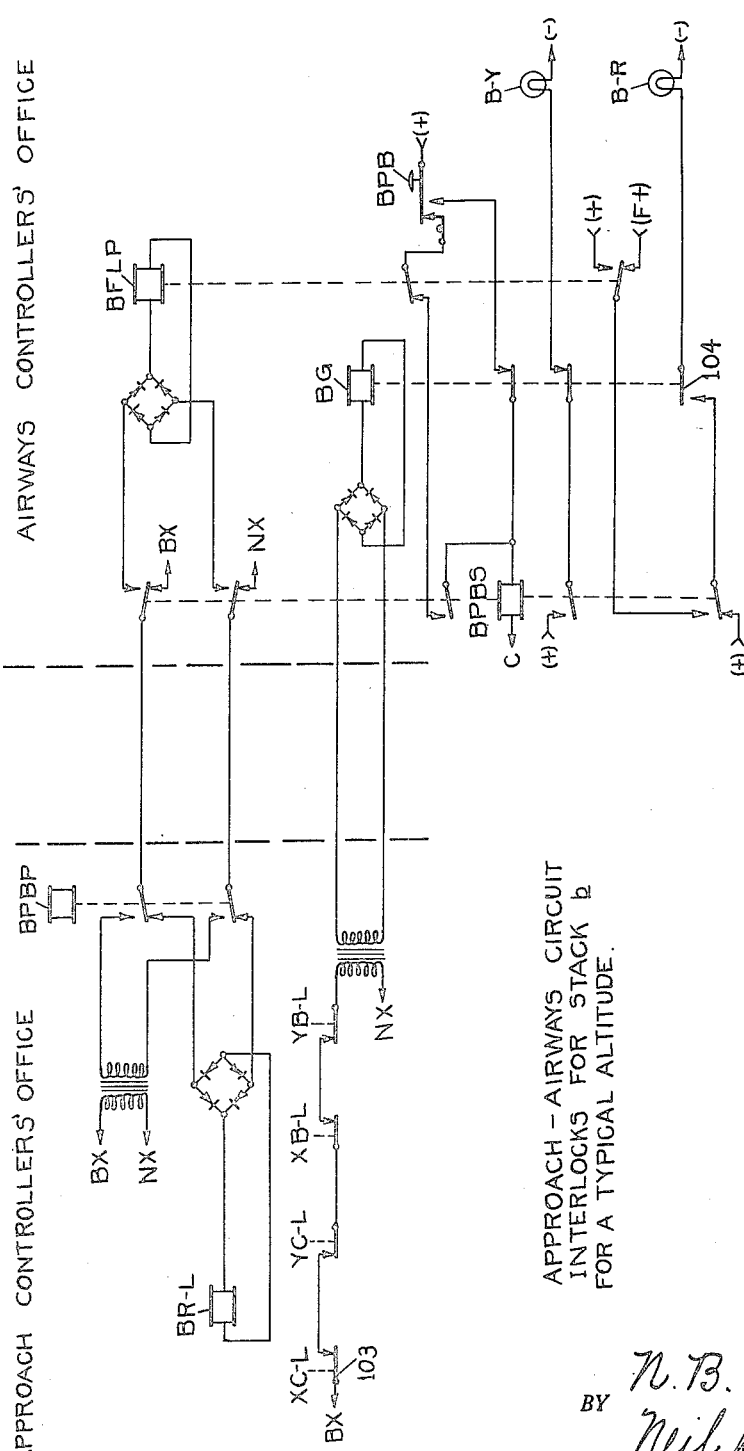
Fig. 7 illustrates the circuit organization provided for interlocking and the communication of indications between an approach controllers' office and an airways controllers' office for a typical flight altitude of another holding stack.

The various illustrations have been made in a conventional schematic manner to more particularly facilitate the illustration of the system organization and mode of operation than to particularly point out the construction and arrangements of parts that would be ordinarily provided in accordance with the requirements of practice. The symbols (+) and (—) have been used to indicate connections to the respective positive and negative terminals of suitable batteries or other sources or direct current, and the symbols (F+) have been used to indicate the connection to the positive terminal of a suitable source of direct current through a suitable interrupter or flashing contact such, for example, as through a contact of a flashing relay such as the relay disclosed in the patent to O. S. Field, Patent No. 2,097,786, dated November 2, 1937. The symbols (BX) and (NX) are used for designation of connections to respective instantaneous positive and negative terminals of a suitable source of alternating current.

System apparatus

The general organization of the system as illustrated in Fig. 1 provides for respective X and Y control boards at an approach controllers' office for use of respective approach controllers in facilitating the supervision of the landing of airplanes, a suitable computer CT being disposed between the X and Y control boards for use by both approach controllers in computing holding loop size for respective airplane landing maneuvers so that the airplanes may be substantially evenly spaced upon their approach to the landing strip. The detail organization and mode of operation having to do with the computing of the holding loop size can be provided as fully disclosed in the prior application of O. S. Field et al., Ser. No. 573,876, filed January 22, 1945, now Patent No. 2,522,029 dated Sept. 12, 1950, and in my copending application Ser. No. 34,962, filed June 24, 1948, now Patent No. 2,475,221 dated July 5, 1949; and reference is to be made to such applications for the specific disclosure of landing operations having to do with the spacing of airplanes by the computer CT upon their being landed.

The boards X and Y and the computer CT are indicated by the dotted line 10 as being electrically connected to a suitable relay cabinet wherein control relays are suitably interlocked for providing the desired mode of operation in the display of indications on the control boards.

Similarly respective control boards T and W are provided at the airways controllers' office such boards being provided for respective airways controllers for keeping track of flights along the airways by use of flight progress strips 16 which are located on the boards at positions indicative of respective flight altitudes over predetermined points along the airways, each strip being generally provided for one airplane flight, and including thereon suitable identification data for that particular airplane.

On the airways controllers' boards T and W are respective control panels TA and WP used in facilitating the transfer of the supervision of respective airplane flights from the airways controllers to the approach controllers. The dotted line 11 indicates circuit connections between these respective control panels TA and WP and a suitable relay cabinet, which in turn is indicated as being suitably connected as by line wires, carrier communication system, or space radio communication system with the relay cabinet at the approach controllers' office by the dotted line 12. It is by this line of communication that lock and/or indication controls are communicated between the approach controllers' office and the airways controllers' office during respective stages of the transfer of supervisory authority of each airplane flight as the airplane approaches the area governed by the approach controllers.

In practice the airways controllers' office is generally remotely located from the approach controllers' office, and thus the circuit organization is particularly organized to require as few distinctive lines of communication as possible extending between the respective offices. It is to be understood, however, that if in practice the airways controllers' office and the approach controllers' office are located relatively close together such as in the same building, the circuit organization herein disclosed may be modified so as not to require the specific circuit organizations which are associated with reducing the number of line wire connections required between the two controllers' offices.

With reference to Fig. 2, a typical one of the approach controllers' control boards is illustrated in an enlarged view showing more clearly the respective push buttons PB, token jacks TJ, and indicator lamps Y and R which are employed in association with respective flight altitudes and holding stacks for purposes to be more clearly understood when considering the mode of operation of the system. The typical board X, according to Fig. 2, comprises three inclined panels A, B, and C which are associated with airplane flights in respective holding stacks $a$, $b$, and $c$ (or $c^1$) as shown in Figs. 9 and 10.

Each of the respective panels A, B, and C has disposed thereon in horizontal alignment indicative of each flight altitude, a push button PB, a token jack TJ, a yellow clearance lamp Y, and a red lock and occupancy lamp R. This apparatus as disposed in the top row on panels A, B, and C, is shown as being associated with airplane flights at the eight thousand foot altitude. Corresponding rows of apparatus is shown as being associated with the other respective flight altitudes by being relatively disposed elevationally on the respective panels in accordance with these altitudes.

Each of the push buttons PB is of the self restoration type having both normally closed and normally open contacts as required by the circuit organization. It is to be understood, however, that other suitable manually operable control means may be employed as a means for designating a request for a clearance in accordance with the requirements of practice. The token jacks TJ are of the type well known in the art wherein the insertion of a plug or token such as the token 13 illustrated in Fig. 11 opens normally closed contacts and closes normally opened contacts. The token 13 is used for insertion in a token jack generally as a means for manifesting the presence of an airplane in the holding stack and at the flight altitude with which that token jack is associated. The token carries suitable airplane identification means such as the identification card 14 (see Fig. 11) bearing the number of the airplane with which it is associated, and any other notations desired to be made thereon by an approach controller for his reference.

It will be noted with reference to Fig. 2 that in addition to the panels of the control board X having a row of buttons, jacks, and indicator lamps for each of the flight altitudes, the center panel C has a row of jacks, indicator lamps and buttons disposed below the row for the one thousand foot flight altitude corresponding to the actual landing of the airplanes on the landing strip. This row of buttons, jacks, and indicator lamps includes three jacks as do the rows for the one thousand, fifteen hundred, and two thousand foot flight altitudes, these three jacks being provided for use in cooperation with three respective units of the computer CT in a manner fully described in the above mentioned application of O. S. Field et al. Ser. No. 573,876, filed January 22, 1945, and in my co-pending application Ser. No. 34,962, filed on even date herewith.

It is to be understood that the distinguishing between the clearance indicator lamps and the occupancy indicator lamps by the respective colors yellow and red is merely an arbitrary means of distinction, and other distinctive indication means can be provided if such is the requirements of practice.

The typical control board X is particularly constructed for use on a table or desk with its respective panels A, B, and C suitably hinged at the points 15 and latched in position by suitable spring fasteners 16 at the bottom of the panels so that the panels can be readily opened upwardly upon the release of the fasteners to facilitate maintenance.

An enlarged view of the airways controllers' board T is shown in Fig. 3 wherein the left-hand panel TA of the board T will be readily identified as corresponding to the panel A of the approach controllers' board X illustrated in Fig. 2 except for the omission of the token jacks from the airways controllers' panel. Tokens are not required on the airways controllers' panel TA as the airways board employs flight progress strips 17 for keeping track of the respective flights. These strips 17 are retained in vertically disposed holders which are adjustable to positions comparable to the altitudes of the airplane flights identified by the strips. The panel TA of the approach controllers' board T is suitably hinged at the point 18 and secured with fasteners 19 at the bottom to facilitate the replacement of indicator lamps and the maintenance and inspection of the wiring of the panel.

Although specific structures are shown and described for the respective approach and airways controllers' control boards, it is to be understood that other forms of organization of the push buttons, token jacks, and indicator lamps can be provided in accordance with the requirements of practice, and it is also to be understood that different assigned flight altitudes may be employed.

With reference to Figs. 4 and 5, circuit organizations are illustrated for a typical flight altitude for governing the energization of lock relays L and indication control relays C in response to the actuation of buttons or token jacks for that altitude. The circuits illustrated in Fig. 4 are for the controlling of relays more particularly associated with board X; and the circuits illustrated in Fig. 5 are more particularly associated with board Y. Relays APBP and BPBP as shown in Fig. 4 are common to both boards X and Y and they are used in the transfer of airplane flights from the supervision of the airways controllers to the supervision of the approach controllers in a manner to be more readily apparent when considering the mode of operation of the system. The relays PBP and L can be of the conventional neutral type, while the relays C are illustrated as being of the magnetic-stick type. Such a type of relay is of the two position polarized type wherein it is maintained in its last actuated position until energy of the opposite polarity is applied. A suitable relay of this general nature is disclosed in the application of J. E. Willing et al., Ser. No. 697,452, filed September 17, 1946, now abandoned.

The Figs. 6 and 7 illustrate apparatus used for a typical altitude and for stacks a and b respectively that is used in coordinating the supervision of airplane flights by airways and approach controllers. These circuit organizations involve the use of airways lock relays AR—L and BR—L which are controlled over a line circuit from the airways controllers' office, push button repeater relays APBS and BPBS at the airways controllers' office, lock repeater relays AFLP and BFLP governed by respective line circuits, and indication control relays AG and BG, the push-pull buttons APB and BPB at the airways office are preferably biased to a center position from which they can be depressed to pick up their associated repeater relays and pulled out to open the stick circuit for their associated relays.

Aside from the control apparatus that has been described as being associated with the approach controllers' office and the airways controllers' office, the organization includes suitable stack markers such as radio beacons located as illustrated in Figs. 9 and 10 to mark the points where turns are to be made by airplanes flying in respective holding stacks. The radio beacons RB1 to RB6 inclusive are all in alignment with the runway and are spaced as illustrated in Figs. 9 and 10 for reasons to be more readily apparent as the description progresses. These radio beacons are preferably made distinctive so that the character of the beacons can signify to airplane pilots their location with respect to the runway.

It is to be understood that the airplanes are equipped with suitable automatic direction finding equipment to permit them to home on the respective beacons, and it is also to be understood that a suitable radio communication means is provided according to the usual practice whereby radio communication is maintained between the airplane pilots and the approach and airways controllers. Such communication system is indicated in the drawings by the respective microphone and headphone jacks 20 and 21 that are to be understood as connecting each controllers' station with suitable radio telephone communication apparatus so that he may maintain communication with the airplanes under his supervision.

Having thus considered the general organization of the apparatus provided for this embodiment of the present invention, consideration will hereinafter be given to the specific circuit organization involved in the control of such apparatus when considering the mode of operation of the system under various typical operating conditions to be encountered in practice.

OPERATION

General

It has been pointed out that the general procedure in and around an airport is that airplanes are fed into holding stacks in approach to an airport by airways controllers, and then the supervision of such airplanes is transferred to an approach controller who supervises the laddering down and spacing of the airplanes as they are landed in sequency on a runway. Because of the large number of landing maneuvers to be handled under heavy traffic conditions, it may be required that a plurality of approach controllers divide up the airplane landing maneuvers to be supervised, the approach controllers having identical control boards such as the board illustrated in Fig. 2. Similarly a plurality of airways controllers is generally required. The airways controllers generally are assigned to the supervision of flights over respective airways, so their respective boards are generally for different airways or sections of airways.

Although it is to be understood that the arrangement of the holding stacks at and in approach of an airport is very much a matter of choice to fit the particular requirements of practice, the holding stacks for this embodiment of the present invention have been arranged as illustrated in Figs. 9 and 10 whereby the radio marker beacons RB1 to RB6 inclusive are spaced in alignment with the runway, each radio beacon being of a distinctive character, such as a distinctive carrier frequency so that an airplane homing on any respective beacon will be aware of its location when reaching that beacon with respect to the runway.

These beacons as arranged according to Figs. 9 and 10 mark respective turning points for outer and inner holding stacks so that a uniform course can be flown in each stack by making procedure left-hand turns at the respective radio beacons. In these holding stacks only one airplane is assigned to a particular flight altitude, and that airplane is expected to fly within the limits of the stack as defined by the radio beacons until the pilot is instructed by an approach controller to vacate that flight altitude.

For convenience in this particular embodiment one beacon at each end of the runway is common to both outer and inner stacks, thus causing such stacks to adjoin each other as illustrated in Fig. 9. The beacon RB2 at the left hand end of the runway is common to the outer stack $a$ and the inner stack $c^1$, thus causing these two stacks to adjoin each other; and, in a similar manner, at the right hand side of the runway, the beacon RB5 is common to the outer stack $b$ and the inner stack $c$ and thus makes these two stacks adjoining each other substantially as illustrated. Because of this proximity of the outer and inner stacks at the respective sides of the runway, it is not considered safe that airplanes should fly at the same altitude at the same time in the adjoining stacks. It is therefore provided circuit wise in this embodiment of the present invention that when clearance has been obtained for an airplane flight in one holding stack at a given elevation, a clearance light cannot be obtained for the adjoining holding stack at the same elevation. It is to be understood, however, that this interlock is required only because of the proximity of the adjoining holding stacks, and that if sufficient space is available in practice, the outer stack can be located sufficiently remote from the airport, and from the inner stack, so that simultaneous occupancy is safe in both outer and inner stacks at a given altitude.

It will be noted that in Figs. 9 and 10, the flight patterns of airplanes at respective altitudes in the inner stack $c^1$ have been shown dotted as only one inner stack $c$ or $c^1$ is used at a time, dependent upon the wind direction, and thus upon which end of the runway airplanes are to approach in landing. It is therefore assumed for this embodiment of the present invention that the right-hand end of the runway is the downwind end and thus the inner stack $c$ is in use. It will be readily understood that it is merely a matter of choice as to which inner stack is to be employed, assuming the stacks to be symmetrically spaced as shown in Figs. 9 and 10, and there is no change in circuiting required in accordance with shifting from one inner stack to the other in accordance with a change in wind direction.

The outer stacks $a$ and $b$ are preferably both used at all times in combination with either of the inner stacks $c$ or $c^1$ in holding airplanes preparatory to their being landed in turn on the runway. Because of the distances between the outer stacks $a$ and $b$ it is considered safe according to this embodiment of the present invention that airplanes occupy the same altitude simultaneously in both of these stacks, but because of the proximity of one or the other of the inner stacks, whichever one is in use, to one or the other of the outer stacks $a$ or $b$, it is provided that clearance is not to be issued for an altitude in either stack $a$ or stack $b$ when that altitude is occupied by an airplane in either inner stack $c$ or $c^1$.

With reference to Fig. 10, flight patterns for only certain altitudes in the respective stacks are illustrated, particularly for the purpose of indicating the general procedure in the landing of airplanes, although means is provided on the respective control panels for attaining clearances for all flight altitudes. That is, the lower three flight altitudes are generally reserved for the inner stack $c$ or $c^1$, whichever one is in use, and it is from these three flight altitudes that the pattern landing approaches involving the three respective computer units are initiated, whereby the airplanes' flight patterns in holding loops are computed so that the airplanes are evenly spaced successively upon the landing on the runway.

The outer stacks $a$ and $b$, however, are used only as holding stacks wherein the airplanes can be laddered down and fed to the third, or two thousand foot flight altitude of the inner stack. In other words, when traffic is heavy and the system is operating at its capacity in accordance with predetermined separation times for the landing of the airplanes, the landing of each airplane permits the laddering down of the airplanes at the respective flight altitudes in the inner stack, and, in accordance therewith, the third altitude in the inner stack becomes vacated, and thus a flight can be transferred to this third altitude of the inner stack from either the outer stack $a$ or the outer stack $b$, and by an airplane leaving such outer stack under these conditions, laddering down can be effected in that outer stack so that airplanes can progressively in turn improve their positions with respect to a landing approach.

Because of the respective approach controllers' control boards being substantially identical, it is a matter of choice as to how the supervision of the landing of the airplanes is to be divided between the respective approach controllers. For example, one approach controller may handle the landing of airplanes that are fed into the stack $a$ by the airways controllers, and another approach controller may handle the landing of airplanes fed into the stack $b$; or it may be that the controllers merely divide up the number of flights between them as the airplanes are fed into both stacks. In either case, the organization of the control boards and their associated control system organization is such as to permit free manipulation in obtaining clearances and other operations by each of the controllers with suitable interlocks being provided to prevent the clearance of more than one airplane into a particular flight altitude.

*Normal conditions*

Conditions to be hereinafter described, and conveniently termed normal conditions, are those conditions which exist when the system is at rest in that there are no airplanes within the area, and no clearances have been designated by a controller.

Under these conditions, the lock relays L associated with the various boards for each of the flight altitudes are all normally energized as is the general practice in lock relay circuits where safety is concerned. Thus a lock relay XA—L (see Fig. 4) is normally energized for each altitude of the board X and the panel A which has been described as being associated with the outer holding stack $a$. The circuit by which the relay XA—L is energized extends from (+), including normally closed contact 22 of the token jack XTJ—A, back contact 23 of indication relay XA—C, winding of relay XA—L, and normally closed contact 24 of the clearance button XAPB, to (—).

By a similar circuit the relay XB—L belonging to the panel B which in turn is associated with the outer stack $b$, is normally energized, such circuit being selected by the contact 25 of the token jack XTJ—B, back contact 26 of the indication control relay XB—C, and the normally closed contact 27 of the clearance push button XBPB, all of which are associated with the panel B of the board X for the typical altitude illustrated.

The lock relay XC—L is associated with the panel C of the board X, which panel is provided particularly for the inner holding stack $c$ or $c^1$, dependent upon which stack is in use. The circuit that is normally energized for the relay XC—L for a typical one of the lower three flight altitudes is selected by contacts 49, 48, 28, 29, and 30 of the token jacks XTJ—C1, XTJ—C2, and XTJ—C3, indication control relay XC—C, and button XCPB respectively, all of which are associated with the panel C of the board X.

With reference to Fig. 5, it will be noted that similar lock relays YA—L, YB—L, and YC—L are energized for the respective panels A, B, and C of the board Y through circuit selections corresponding to those which have been specifically described with reference to Fig. 4 as being provided in association with the board X for each flight altitude. It is therefore provided that a lock relay L is normally energized for each flight altitude of each of the panels A, B, and C, and for each of the boards X and Y.

With reference to Fig. 6, a lock relay AR—L is normally energized for the typical altitude illustrated in accordance with there having been manifest no request for clearance for that altitude of the holding stack $a$ at the airways controllers' office. Because of the energization of the relay AR—L over a line circuit that may be of considerable length, the relay has been illustrated as being energized by rectified alternating current, the alternating current being used for line circuit energization. Thus the line circuit by which the relay AR—L is energized involves the application of alternating current to the input terminals of the full-wave rectifier unit by a circuit extending from BX, including back contact 31 of the push button stick relay APBS, line wire 32, back contact 33 of the push button repeater relay APBP, rectifier 34, back contact 35 of relay APBP, line wire 36, and back contact 37 of relay APBS, to NX. The relay AR—L is directly connected across the output terminals of the full-wave rectifier 34.

By an organization somewhat similar, the relay AG at the airways controllers' office is normally energized. This relay is provided for the typical altitude illustrated in Fig. 6 and for the holding stack $a$. The relay AG is connected directly across the output terminals of the full-wave rectifier 38, and the input terminals of the rectifier unit 38 are connected across the secondary winding 40 of the transformer 39 at the approach controllers' office by the line wires 41 and 42. The primary winding 43 of the transformer 39 is energized by alternating current in a circuit extending from BX, including front contact 44 of relay XC—L, front contact 45 of relay YC—L, front contact 46 of relay XA—L, front contact 47 of relay YA—L, and the primary winding 43 of the transformer 39, to NX.

With reference to Fig. 7, similar lock and indication relays BR—L and BG at the approach and airways controllers' offices respectively are normally energized for the typical altitude illustrated, such relays being associated with the holding stack $b$.

It is therefore apparent from the circuits described of Figs. 6 and 7 that a normally energized lock relay AR—L or BR—L at the approach controllers' office is controlled over a line circuit from the airways controllers' office for each flight altitude of each outer holding stack. Similarly an indication control relay G at the airways controllers' office is normally energized for each altitude and for each stack in accordance with a control circuit extending from the approach controllers' office checking that the lock relay associated with that altitude and with that stack or any conflicting stack at the controllers' office are all in their energized positions.

It will be noted that the respective yellow and red lamps shown for the typical altitude of Fig. 6 for stack $a$ and Fig. 7 for stack $b$ are normally dark because of their circuits being open by there having been no clearance requested by the actuation of the push button PB for the associated altitude and stack.

With reference to Fig. 8 in which the control circuits are shown for the respective yellow and red indicator lamps Y and R for the approach controllers' boards X and Y, it will be noted that these lamps are normally dark, as they are illuminated only as airplane flights are designated for the associated stack and altitude.

*Transfer of supervision of flights*

Having thus considered the general organization of the system together with the normal conditions, a typical condition of operation will be considered wherein it is assumed that an airplane flight is approaching the airport under the supervision of the airways controller operating the flight progress board T shown in Figs. 1 and 3. The airways controller, by viewing the indicator lamps on his control panel $TA^1$ notes that these lamps are all dark, thus being indicative of the holding stack $a$ as being unoccupied by airplanes.

He then actuates the push button PB on his panel A¹ for the particular flight altitude at which he desires the approaching airplane to enter the holding stack a, and thereby obtains a yellow clearance light for that altitude to indicate that his designation of that altitude has locked out the use of that altitude by any other controller in governing another airplane flight.

The actuation of a push button PB under such conditions by the airway's controller causes the flashing of the red lamp R of each of the approach controllers boards for that flight altitude and stack to indicate that the airways controller has designated a flight to be transferred to the supervision of the approach controllers. It is then up to the approach controllers to decide which is to take charge of the airplane flight under consideration, and in accordance with such decision, and upon receiving communication from the airways controller as to the identity of the airplane flight to be transferred, the airways controller who is to supervise the flight then notes the airplane identification on a token tag and inserts the token in the outer token jack on the panel for the outer holding stack that the airplane is approaching, and at the particular altitude that has been designated by the airways controller. This is a reminder to the approach controller that he is to supervise the flight that is to be transferred. That approach controller then contacts the airplane by radio to advise the pilot of the transfer of supervision and upon establishing such contact he moves the token to the inner row of vertical token jacks.

The insertion of the token by the approach controller in the inner row of token jacks changes the indication on the airways controller's board from steady yellow to flashing red to indicate to the airways controller that contact with the airplane has been made by the approach controller, but that the airplane has not yet reported as having entered the outer holding stack. Also by the insertion of the token under these conditions, the red indicator lamp on the other approach controller's board is changed from flashing to steady energy to indicate to that approach controller that the flight is being taken care of.

Upon the airplane flight under consideration reporting as entering the outer stack at the specified altitude, the approach controller actuates a push button for that flight altitude and for that stack, and in accordance therewith the approach controller's indicator lamp for that altitude is changed from flashing to steady as is the red indicator lamp R on the panel of the airways controller's board.

Having considered the general mode of operation in the transfer of a flight from the supervision of an airways controller to the supervision of an approach controller, consideration will now be given to the specific circuit organization involved to provide the above described general mode of operation.

Assuming that the airways controller actuates a button APB for a particular altitude on the panel TA of his control board T, the actuation of this push button APB, according to the circuits of Fig. 6, cause the picking up of the push button stick repeater relay APBS. The circuit by which relay APBS is energized extends from (+), including contact 50 of button APB in its depressed position, front contact 51 of relay AG, and winding of relay APBS, to (—). Upon restoration of the push button APB, a stick circuit is closed to maintain the relay APBS picked up extending from (+), including contact 50 of button APB in its normally closed position, back contact 52 of relay AFLP, front contact 53 of relay APBS, and winding of relay APBS, to (—).

Upon the picking up of relay APBS, the yellow lamp A—Y becomes steadily energized by a circuit extending from (+), including front contact 54 of relay APBS, front contact 55 of relay AG and lamp A—Y, to (—). Upon observing the illuminated yellow lamp, the airways controller is advised that he has the clearance for the airplane to enter the holding stack a at that particular altitude, and as the description progresses it will be readily understood that by obtaining this yellow light he is assured that the boards of the approach controllers have been locked out so that no clearance lights can be obtained on these boards for the same flight altitude. It is similarly provided that the airways controller cannot get his yellow light Y in response to the actuation of his push button APB for a flight altitude that has been preempted by one of the approach controllers. This is true because the relay APBS requires the front contact 51 of relay AG to be closed in its pick up circuit, and the relay AG is maintained picked up only so long as the lock relays for the corresponding flight altitude of the stack a and the inner stack c are picked up. These contacts are shown in Fig. 6 as comprising the contacts 44 and 45 of the inner stack locked relays XC—L, YC—L of the respective X and Y boards, together with the front contacts 46 and 47 of the relays XA—L and YA—L for that altitude of the stack a and for the boards X and Y respectively.

In accordance with the picking up of the push button repeater relay APBS at the airways controller's office, the shifting of contacts 31 and 37 of that relay opens the line circuit that has been described as being normally effective for maintaining the lock relay AR—L picked up at the approach controller's office. The dropping away of this relay opens a circuit at front contact 56 (see Fig. 4) to prevent the energization of the indication control relay XA—C in case the controller of board X should attempt to obtain a clearance light for the same altitude of the same holding stack that has been designated by the airways controller. With reference to Fig. 5, the contact 57 of relay AR—L acts in preventing the energization of the indication control relay YA—C associated with the board Y in a similar manner.

Upon the dropping away of the lock relay AR—L for the particular flight altitude under consideration, the red lamps XA—R and YA—R (see Fig. 8) become energized with flashing energy. The circuit by which the lamp XA—R is energized extends from (F+), including back contact 58 of relay APBP, back contact 59 of relay AR—L, front contact 60 of relay YA—L, back contact 61 of relay XA—C, and lamp XA—R, to (—). The circuit by which the lamp YA—R of the board Y is energized for the flight altitude under consideration extends from (F+), including back contact 58 of relay APBP, back contact 59 of relay AR—L, front contact 62 of relay XA—L, back contact 63 of relay YA—C, and lamp YA—R, to (—). It is thus established up to this point in the description of the circuits that the yellow lamp Y on the airways controller's board is steadily energized as a clearance indication for the altitude which has been designated, and the red lamps R on the panels A of the respective boards X and Y are energized with flashing energy to indicate that a flight is to be transferred from the airways controller.

The airways controller then communicates identification of the airplane to the approach controllers as by telephone communication and the approach controller who is to accept supervision of the landing of this airplane then marks the identity of the airplane on the tag of a token (such as on the tag 14 of the token 13 of Fig. 11) and inserts the token in his board at the particular altitude of the flight and in the outer (left-hand) row of token jacks of panel A which are merely storage jacks with no circuits controlled thereby. The token thus serves as a reminder that the approach controller is to contact the airplane, and, subsequent to such contact being established, he moves the token from the outer vertical row of token jacks to the inner (right-hand) vertical row of token jacks of panel A for the particular flight altitude. In accordance with this procedure, assuming that the approach controller of board X is the one to accept the flight, the insertion of the token in the jack XTJ—A (see Figs. 2 and 4) opens the normally closed contact 22 in the circuit for the lock relay XA—L.

By the dropping away of relay XA—L, the flashing circuit for the red lamp YA—R (see Fig. 8) of the board Y is opened at front contact 62, and the closure of back contact 62 establishes an obvious circuit for the steady energization of this lamp. The red lamp XA—R, however, on the control board X continues to flash as an indication to the approach controller that he has not yet designated the arrival of the airplane into the holding stack a.

The insertion of the token in the jack XTJ—A, by causing the dropping away of the relay XA—L, opens the circuit for the normally energized relay AG (see Fig. 6) at front contact 46, and thus the relay AG at the airways controller's office is dropped away in response to the insertion of the token in the jack XTJ—A at the approach controller's office. The dropping away of relay AG, by opening front contact 55, extinguishes the yellow lamp A—Y, and by the closure of its back contact 64 establishes a circuit for the energization of the red lamp A—R with flashing energy. This circuit for the energization of the lamp A—R extends from (F+), including back contact 65 of relay AFLP, front contact 66 of relay APBS, back contact 64 of relay AG, and lamp A—R, to (—).

Because of the proximity of the respective stacks a, c, and b, it has been pointed out that the stack c is not to be occupied by an airplane for a flight altitude which is occupied at the same time by an airplane in either stack a or stack b. It is therefore provided that as soon as the token is inserted as described above in the panel A of the board X for a particular flight altitude, the dropping away of the lock relay XA—L by the insertion of this token causes the steady energization of the red lamps XC—R and YC—R for the corresponding altitudes on the center panel C of the respective boards X and Y. The lamp XC—R is steadily energized through back contact 74 of relay XA—L and back contact 75 of relay XC—C. The lamp YC—R is steadily energized through back contact 74 of relay XA—L and back contact 76 of relay YC—C.

After the airplane has reported as entering the holding stack a at the particular altitude for which clearance has been designated by the airways controller, the approach controller of the machine X actuates his push button XAPB for that flight altitude, and in accordance there- with, the relay APBP (see Fig. 4) is picked up by the energization of a circuit extending from (+) including front contact 67 of relay XC—L, front contact 68 of relay YC—L, contact 69 of button XAPB in its depressed position, back contact 70 of relay XA—L, front contact 71 of relay YA—L, back contact 56 of relay AR—L, contact 72 of token jack XTJ—A, and winding of relay APBP, to (—).

With reference to Fig. 6, the picking up of relay APBP applies alternating current energy to the line wires 32 and 36 at the approach controller's office whereby energy is fed through front contacts 31 and 37 of relay APBS at the airways controller's office, and through the full-wave rectifier 73 to pick up the relay AFLP. The relay AFLP upon being picked up opens back contact 52 in the stick circuit for the push button stick relay APBS and causes that relay to be dropped away. The shifting of contact 65 of relay AFLP changes the lamp A—R from flashing to steady energization. The dropping away of relay APBS applies steady energization to the lamp A—R through back contact 66 and back contact 64 of relay AG. Such steady energization is maintained in accordance with the closure of back contact 64 of relay AG as long as the token remains in the token jack XTJ—A on the board X in the approach controller's office.

In accordance with the picking up of the relay APBP in response to the actuation of the push button XAPB on the approach controller's board X, the energization of the red lamp XA—R (see Fig. 8) on the panel A of the board X is changed from flashing to steady energy by the shifting of contact 58.

Having thus considered the respective steps in the transfer of the supervision of an airplane flight from an airways controller to an approach controller, it will now be assumed that the flight which has been transferred has been laddered down from its original flight altitude in the holding stack in a manner to be hereinafter more specifically considered, so as to permit the restoration of the circuit organization to its normal conditions. Such restoration is initiated, upon removing the token for that airplane from its token jack, which has been assumed to be the jack XTJ—A of Fig. 4.

In accordance with the removal of the token from the jack XTJ—A, the contact 22 of that jack is again closed, and with the relay XA—C dropped away to close contact 23, and the button XAPB in its normal position to close contact 24, the lock relay XA—L is restored to its normally picked up position. Also upon the removal of the token, the contact 72 in the circuit for the relay APBP is opened but this relay has already been deenergized upon the opening of contact 69 of button XAPB upon restoration of that button to its normal position.

With reference to Fig. 6, upon the dropping away of the relay APBP, with the relay APBS at the airways controller's office dropped away as has been heretofore described, the circuit which has been described for the normal energization of the lock relay AR—L at the approach controller's office is reestablished. In accordance with the picking up of the relay AR—L, the opening of its back contact 59 (see Fig. 8) in the circuit for the red lamps XA—R and YA—R causes the extinguishing of these lamps, there being no energy applied to their circuits through the front contact 59 of relay AR—L, because of the relays XC—L and YC—L being both picked up at that time. Because of relay XA—L having been picked up, the circuit for lamp YA—R is open at back contact 62.

At the airways controllers' office, the relay AG is picked up by the reestablishment of its normally energized circuit in response to the picking up of the relay XA—L, and the picking up of this relay completes the restoration of the parts of the system which have been actuated during the mode of operation in the transfer of the supervision of the airplane flight. The red lamp A—R on the panel TA of the airways controller's board T is extinguished by the opening of its circuit at back contact 64 of relay AG.

*Clearance obtained by approach controller*

Assuming that an airplane flight has been brought into the holding stack at a particular assigned flight altitude as by the mode of operation that has been described, as preceding airplanes are landed so as to vacate the lower flight altitudes, the airplane can be laddered down through respective lower flight altitudes as they are vacated in accordance with clearances obtained by the approach controller, and the airplane can be eventually moved into the inner stack from which its landing maneuver can be computed by one of the units of the computer. A typical mode of operation in laddering down from one altitude to another will be considered, and it is to be understood that this mode of operation is typical of the mode of operation that is employed in the laddering down through other respective flight altitudes as required in either the outer or the inner holding stack.

It is therefore assumed that the next lower flight altitude is vacated and that the approach controller of the board X actuates his push button XAPB (see Fig. 4) for obtaining a clearance at that altitude. The actuation of that button causes the dropping away of the associated lock relay XA—L, and the dropping away of that relay under such conditions applies energy of a positive polarity to the magnetic stick relay XA—C to operate the contacts of that relay to their picked up positions. The circuit for the energization of the relay XA—C extends from (+), including front contact 67 of relay XC—L, front contact 68 of relay YC—L, contact 69 of button XAPB in its depressed position, back contact 70 of relay XA—L, front contact 71 of relay YA—L, front contact 56 of relay AR—L, normally closed contact 77 of token jack XTJ—A, and winding of relay XA—C, to the common terminal C of a center tap battery.

The picking up of relay XA—C by the opening of front contact 23 maintains the circuit open for the relay XA—L subsequent to the restoration of the clearance push button XAPB to its normal position. The relay XA—L is therefore maintained steadily deenergized for maintaining an interlock in the circuits to prevent the controller of board Y or an airways controller from obtaining clearance for the same flight altitude. According to Fig. 8, the yellow lamp XA—Y associated with that clearance button XAPB on the control board X becomes steadily energized. The circuit by which the lamp XA—Y is energized extends from (+), including front contact 78 of relay AR—L, front contact 79 of relay XA—C, and lamp XA—Y, to (—). It will be noted that the yellow lamp YA—Y on the board Y is maintained dark because the indication control relay YA—C associated with the board Y is maintained dropped away.

It is desirable, however, to indicate on the board Y that the particular flight altitude under consideration has been preempted by the controller of board X, and this indication is provided by the energization of the red indicator lamp YA—R for that flight altitude on the board Y. The lamp YA—R is energized under these conditions by a circuit extending from (+), including back contact 62 of relay XA—L, back contact 63 of relay YA—C, and lamp YA—R to (—).

It is similarly provided that in accordance with the flight altitude under consideration being preempted by the approach controller of the board X, the red lamp for that flight altitude on the panel TA of the airways controller's board for the same holding stack and the same altitude is steadily energized. This is accomplished, with reference to Fig. 6 because of the circuit for the relay AG being opened by the dropping away of the relay XA—L at front contact 46 in response to the actuation of the clearance button XAPB on the approach controller's board X. Thus upon the dropping away of the relay AG at the airways controllers' office, the red lamp A—R for that altitude on the panel TA is steadily energized by a circuit extending from (+), including back contact 66 of button APBS, back contact 64 of relay AG, and lamp A—R, to (—).

Having thus obtained the yellow clearance light for the flight altitude into which the approach controller wishes to ladder down an airplane, he can proceed to communicate with the airplane and instruct the pilot to descend. Upon being informed by the pilot that his descent has been initiated, the approach controller moves the token for that airplane down to the altitude position on his board to which the airplane has been cleared, and thus upon insertion of the token into the token jack XTJ—A for that altitude, the opening of the normally closed token jack contact 22 (see Fig. 4) maintains the lock relay XA—L dropped away so as to maintain the steady energization of the red indicator lamps R on the other approach controller's board, and on the airways controller's board.

The insertion of the token changes the polarity of energization of the magnetic stick indication control relay XA—C so that such relay is energized with a polarity to drive its contacts to their dropped away positions. The circuit by which the relay XA—C is energized under these conditions extends from (—), including front contact 80 of the relay XA—C, contact 77 of the token jack XTJ—A closed with the token inserted, and winding of relay XA—C to the common terminal C of a center tap battery. It will be noted that the operation of the relay XA—C in response to this reversal in polarity opens the circuit just described at front contact 80 of the relay XA—C so that the relay XA—C is restored to its normal position and is deenergized.

The restoration of the relay XA—C as has been described extinguishes the yellow clearance lamp XA—Y (see Fig. 8) by the opening of front contact 79, and effects the steady energization of the associated red lamp XA—R. The circuit for the red lamp XA—R extends from (+), including back contact 62 of relay XA—L, front contact 81 of relay AR—L, back contact 61 of relay XA—C, and lamp XA—R, to (—).

It is thus provided that, for a flight altitude that has been preempted, the insertion of the token in the token jack in accordance with the movement of the airplane to that altitude establishes a condition wherein the occupancy of that altitude in that particular holding stack is indicated by a red lamp on both panels A of the approach controllers' boards X and Y and on the panel TA of the airways controller's board T.

If it is assumed that the next lower flight altitude has become vacated so that a clearance may be obtained to move the airplane under consideration to the next lower altitude in the holding stack $a$, consideration can be given to the mode of operation in the extinguishing of the red lamps that have just been considered and the restoration of parts of the organization associated therewith to normal.

Thus when the token in the token jack XTJ—A is removed under such conditions, the relay XA—L becomes picked up because of the energization of a circuit that has been described when considering the normal conditions of the system, and upon the picking up of that relay, with reference to Fig. 8 the opening of back contact 62 removes energy from the circuit that has been described for energization of the red lamps XA—R and YA—R to cause such lamps to be extinguished. With reference to Fig. 6, the picking up of the relay XA—L in closing its front contact 46 reestablishes a circuit that has been described when considering the normal conditions of the system so as to restore the indication control relay AG at the airways controllers' office to its normally energized position. Upon the picking up of the relay AG, the red lamp A—R on the panel TA of the board T is extinguished by the opening of back contact 64.

*Clearance from outer to inner stack*

A general mode of operation has been described wherein the airplanes when laddered down in the outer stacks are transferred to either the inner stack $c$ or $c^1$ from which they can be landed according to computed landing maneuvers. Having described how the airplanes can be brought into the outer stacks and laddered down therein, consideration will now be given to the mode of operation in moving the airplanes into the inner stack.

In order to handle a maximum amount of traffic, it is preferable that the airplanes be fed into the inner stack at least at the highest altitude at which landing maneuvers are computed which for this embodiment of the present invention is assumed to be the third or 2000 foot flight altitude. They can be transferred to this altitude either from the same altitude in an outer stack or from a different altitude in the outer stack. In all probability, when the traffic is relatively heavy, the airplanes would be fed from the three thousand foot altitude of the outer stacks to the two thousand foot altitude of the inner stack. It is this mode of operation that will now be considered.

Inasmuch as only the approach controllers are interested in the landing maneuvers involving the inner stack, it will be noted that no panel for the inner stack is provided on the airways controllers' control boards, and thus the airways controllers' boards are not concerned with the landing maneuvers from the inner stack.

To consider a typical condition to be encountered in the practice of the present invention, it will be assumed that an approach controller wishes to clear an airplane flight from the three thousand foot altitude of the outer stack $a$ to the two thousand foot altitude of the inner stack $c$ (or $c^1$). The mode of operation in obtaining the clearance is similar to that which has been described for obtaining a clearance to ladder down in the outer stack. The controller actuates the clearance button XCPB for the two thousand foot altitude on the panel C of the board X, and, in accordance with the actuation of this button XCPB (see Fig. 4), the opening of front contact 30 in the circuit for the lock relay XC—L causes the dropping away of that relay, and in its dropping away an interlock is established to prevent clearances from being obtained for either of the outer stacks by either board X or board Y or the airways boards T and W for that altitude, or for the stack $c$ for that altitude by the board Y. The interlock for the panels A and B of board X is established by opening the front contact 67 of relay XC—L as shown in Fig. 4 to prevent the energization of the indication control relays XA—C and XB—C for the particular two thousand foot altitude under consideration. It has been pointed out that a requisite in obtaining a yellow clearance light is that the indication control relay C associated therewith must be energized with a polarity to cause the contacts of that magnetic stick relay to be picked up.

With reference to Fig. 5 a similar condition exists with respect to the circuits for the board Y in that the opening of front contact 82 of relay XC—L prevents the energization of the indication control relays YA—C, YB—C and YC—C for the respective panels A, B and C of the board Y. It is by the opening of the circuits for these relays that the actuation of the clearance buttons on these panels for the two thousand foot altitude is prevented from being effective to obtain energization of the associated yellow clearance lamp.

Considering again the circuits of Fig. 4 for the board X, it will be noted that while the clearance button XCPB is depressed, the contact 83 of this button is closed to shunt the front contact 67 of the relay XC—L which normally applies energy to the circuit organization for the control of the relay XC—C. It is therefore provided that energy is applied to the indication control relay XC—C when the button XCPB is depressed, and after the lock relay XC—L is dropped away, to effect the action of the contacts of the magnetic stick indication relay XC—C to their picked up positions. This circuit extends from (+), including contact 83 of button XCPB in its depressed position, front contact 68 of relay YC—L, front contact 84 of relay XA—L, front contact 85 of relay XB—L, front contact 86 of relay YB—L, front contact 87 of relay YA—L, front contact 88 of relay BR—L, front contact 89 of relay AR—L, normally closed contact 105 of the token jack XTJ—C3, normally closed contact 106 of the token jack XTJ—C2, normally closed contact 99 of the token jack XTJ—C1, winding of relay XC—C, and back contact 91 of relay XC—L, to the common terminal C of a center tap battery. The relay XC—C when picked up opens the circuit for the lock relay XC—L at back contact 29 so as to cause the relay XC—L to remain dropped away subsequent to the restoration of the clearance push button XCPB.

With reference to Fig. 8, the picking up of the relay XC—C energizes the yellow lamp XC—Y of the panel C of the board X for the two thousand foot altitude upon the closure of its front contact 92.

On the panel C of the board Y, the red lamp

YC—R for the two thousand foot altitude becomes steadily energized in response to the lock relay XC—L having been dropped away because of the energization of a circuit extending from (+), including back contact 93 of relay XC—L, back contact 76 of relay YC—C, and lamp YC—R, to (—). The circuit for the corresponding lamp on board X is open at this time at back contact 75 of relay XC—C.

With reference to Fig. 8, the dropping away of the relay XC—L as has been described causes the energization of the red lamps XA—R, YA—R, XB—R, and YB—R. The lamp XA—R on panel A of board X for the altitude under consideration is energized in accordance with the closure of back contact 62 of relay XA—L if the token is assumed to be inserted in the associated token jack, however when the token is subsequently removed this lamp is still energized by a circuit extending from (+), including back contact 93 of relay XC—L, front contact 95 of relay XB—L, front contact 96 of relay YB—L, front contact 59 of relay AR—L, front contact 60 of relay YA—L, back contact 61 of relay XA—C, and lamp XA—R, to (—). The lamp YA—R is energized by a similar circuit extending from (+), including back contact 93 of relay XC—L, front contact 95 of relay XB—L, front contact 96 of relay YB—L, front contact 59 of relay AR—L, front contact 62 of relay XA—L, back contact 63 of relay YA—C, and lamp YA—R to (—). The circuit for the lamp XB—R extends from (+), including back contact 93 of relay XC—L, front contact 74 of relay XA—L, front contact 97 of relay YA—L, front contact 98 of relay BR—L, front contact 99 of relay YB—L, back contact 100 of relay XB—C, and lamp XB—R, to (—). The lamp YB—R is energized by a circuit extending from (+), including back contact 93 of relay XC—L, front contact 74 of relay XA—L, front contact 97 of relay YA—L, front contact 98 of relay BR—L, front contact 101 of relay XB—L, back contact 102 of relay YB—C, and lamp YB—R, to (—).

With reference to Fig. 6, because of the lock relay XC—L associated with the inner stack having been dropped away, the opening of front contact 44 in the circuit for the relay AG at the airways controllers' office causes the dropping away of that relay, and the closure of back contact 64 of that relay in the circuit for the red lamp A—R causes the illumination of that lamp for the corresponding two thousand foot altitude on the panel TA of the airways controllers' board T. Similarly with reference to Fig. 7, the opening of front contact 103 in the circuit for the indication control relay BG provides for the energization of the lamp B—R by the closure of back contact 104, the lamp B—R being provided for the two thousand foot altitude on the panel WB of the airways controllers' board W.

Having obtained the yellow clearance light for the two thousand foot altitude of the inner stack c, the controller of the board X then communicates by radio telephone with the pilot of the airplane that has been flying at the three thousand foot altitude in the stack a and instructs him to descend to the two thousand foot altitude and enter the inner holding stack c. The airplane pilot upon receiving these instructions sets his direction finder for the frequencies of the radio beacons RB5 and RB6 and reports to the controller of the board X when his descent is initiated.

The controller of board X then moves the token for the airplane from the jack XTJ—A in the three thousand foot altitude position on panel A to the jack XTJ—C in the two thousand foot altitude position on panel C. There are three token jacks for each of the lower altitudes of the stack c at which computed landing maneuvers can be initiated for association with three respective computer units. The token is inserted in a token jack for the two thousand foot altitude on the panel C for a computer unit that is suitably indicated as being in condition for computing a landing maneuver. By insertion of the token into the token jack XTJ—C1, for example (see Fig. 4), the normally closed contact 28 in the circuit for the relay XC—L, is opened, and the shifting of the contact 90 to the left-hand position pole changes the indication control relay XC—C to effect the operation of the contacts of that relay to their dropped away positions.

Thus, according to Fig. 8, the dropping away of the relay XC—C extinguishes the yellow lamp XC—Y by the opening of front contact 92 and steadily energizes the red lamp XC—R for the two thousand foot altitude. The circuit by which this lamp is energized extends from (+), including back contact 93 of relay XC—L, back contact 75 of relay XC—C, and lamp XC—R, to (—). Thus in accordance with the occupancy of the two thousand foot altitude in the inner stack c, red indicator lamps are steadily energized on the panel C for the two thousand foot altitude on both the boards X and Y.

Another condition under which it is at times desirable to obtain a clearance for the inner stack is the condition where it is desired to move an airplane into the inner stack from one of the outer stacks at the same altitude. In other words, the condition that has just been described is a condition assuming that the airplane is moved from the outer stack to the inner stack upon descent from a different altitude, and it has been assumed that the outer stacks were both unoccupied by an airplane at an altitude at which the clearance was designated for the inner stack. The condition that is now to be considered is the condition where one of the outer stacks is occupied at the altitude for which the clearance is to be requested for the inner stack, and it will be assumed that it is desired to move that airplane to the inner stack under these conditions.

Because of the proximity of the respective inner and outer stacks, it has been pointed out that the circuits are so interlocked that clearance is obtained for a particular altitude in the inner stack only provided that both outer stacks a and b are unoccupied at that altitude. It will be readily recognized, however, that it would be safe if only one of the outer stacks were occupied at that altitude to move the airplane from the outer stack to the inner stack. Under this condition there is still the safety of providing that only one airplane can be given clearance for a given altitude in either of the stacks, but it is desirable to provide the facility of being able to move that one airplane from the outer stack to the inner stack so that a landing maneuver may be initiated.

This particular type of an operation requires a special manipulation in that it is desirable that a complete understanding be had by the controller that his clearance can be obtained for the movement of that particular airplane only, rather than being obtained for an airplane at another altitude. It is therefore required that in order to obtain a clearance under these conditions, the controller must actuate both the clearance push button for the inner stack and the clearance push button for the outer stack simultaneously to thereby signify that he understands the clearance is for movement of an airplane at only the particular altitude from the outer stack to the inner stack.

To consider the specific mode of operation, with reference to Fig. 4, it will be assumed that a controller of board X actuates the button XAPB for a selected altitude that is occupied by an airplane in the stack $a$, and at the same time actuates the button XCPB for the same altitude for the inner stack $c$ for which the clearance is desired to be obtained. In accordance with the stack $a$ being occupied at that altitude, a token has been inserted in the token jack XTJ—A; and thus the relay XA—C has been restored to its dropped away position and the relay XA—L is maintained deenergized because of the opening of its circuit at contact 22 by the insertion of the token.

The depression of the button XCPB cannot ordinarily be effective to obtain a clearance light by energization of the relay XC—C if the relay XA—L or the relay XB—L is dropped away because of the inclusion of contacts 84 and 85 of these relays respectively in one branch of the circuit and the inclusion of the other contacts 120 and 121 in series respectively in another branch of the circuit. The closure of the contact 69 of the button XAPB in its depressed position, however, is effective to shunt the front contact 84 of the relay XA—L and thereby permit the relay XC—C to be energized when button XCPC and XAPB are simultaneously depressed. The circuit by which relay XC—C is energized under such conditions extends from (+), including contact 83 of the button XCPB in its depressed position, front contact 68 of relay YC—L, contact 69 of the button XAPB in its depressed position, front contact 85 of relay XB—L, front contact 86 of relay YB—L, front contact 87 of relay YA—L, front contact 88 of relay BR—L, front contact 89 of relay AR—L, normally closed contacts 105, 106, and 90 of the token jack XTJ—C3, XTJ—C2, and XTJ—C1 respectively, winding of relay XC—C and back contact 91 of relay XC—L which is dropped away by the depression of the button XCPB in a manner that has been heretofore described, to the common terminal C of a center tap source of direct current.

With reference to Fig. 8, the picking up of the relay XC—C energizes the yellow clearance light XC—Y upon the closure of front contact 92. The red lamp YC—R on the panel C of board Y for the altitude under consideration has been steadily energized because of the occupancy of the outer stack $a$ by the airplane, the lock relay XA—L having been dropped away upon insertion of the token into the panel A of the board X for the corresponding altitude. The red lamp YC—R is energized under these conditions by a circuit including back contacts 74 and 76 of relays XA—L and YC—C respectively. It is therefore provided that the clearance is obtained for movement of the airplane from the outer stack $a$ to the inner stack $c$ at the same altitude, and the approach controller thus proceeds to advise the pilot of the airplane that he is to move into the inner stack. When the airplane reports leaving the outer stack and entering the inner stack, the token for that airplane is moved from the outer stack to the inner stack.

*Landing from the inner stack*

As the airplanes are fed into the inner stack, their landing maneuvers as timed by respective computer units are initiated so as to effect the relatively even spacing of the airplanes as they approach the runway. The specific organization for computing the landing patterns for the respective airplanes can be as disclosed in my copending application Ser. No. 34,962, filed June 24, 1948, and reference is to be made to this application for description in detail as to the specific mode of operation of the organization involved in computing landing maneuvers. It is therefore unnecessary to consider in this application other than the general mode of operation involved and the manner in which the airplanes are laddered down in the inner stack.

With reference to Fig. 10, it is indicated that the airplane 110 is about to land on the runway, and spaced behind this airplane a predetermined separation time is the airplane 111 which is flying toward the runway at the 1000 ft. altitude. The airplane 111 is flying toward the beacon RB5 in alignment with the beacon RB6 in a holding loop of a pattern determined by one of three computer units. The airplane 112 is illustrated in Fig. 10 as just initiating flight of a holding loop of a pattern determined by a second computer unit, and the airplane 113 which may have just entered the 2000 ft. altitude as has been described above can have its landing maneuver computed by a third computer unit. Such third computer unit is initiated into a landing maneuver cycle a predetermined time equal to the desired separation time between airplanes subsequent to the initiation of the second computer unit which has been assumed to be used for computing the pattern for the landing of the airplane 112. These respective computer units are associated with the landing of respective airplanes rather than being associated with particular flight altitudes.

At the end of this separation time interval the approach controller is advised by suitable indication means that a landing maneuver cycle of the computer No. 3 is initiated, and thus he calls the pilot of the airplane 113 and instructs him to fly toward the beacon RB5. The computer unit measures the stack-loss time from the time the airplane is called until the airplane reports over the beacon RB5. When the airplane 113 is over the beacon RB5, the computer indicates a heading angle for the airplane to fly, and initiates the timing of the out-time that the airplane must fly at this heading before it makes a procedure turn for approaching the runway along a suitable glide path. When the out-time has expired, the pilot of the airplane is instructed by the approach controller to make his procedure turn, and the approach controller then actuates a button restoring the computer unit that has been associated with timing that landing maneuver so that the landing maneuver of another airplane may be timed by that computer unit.

The laddering down of the airplanes in the inner stack is accomplished in a manner corresponding to that which has been specifically described with respect to the mode of operation of laddering airplanes down in the outer stacks. In other words, with reference to Fig. 2, when the first airplane 110 reports as having landed, the token for that airplane which would have been in a token jack XTJ—C1 for the ground position is removed, and the next airplane to land is given clearance to descend to the runway subsequent to the approach controller's actuation of his clearance button XCPB for the ground position GD. The clearance light for this position is obtained in a manner corresponding to that which has been described for obtaining a clearance light under other conditions, except that suitable interlock is provided to check that no take-offs have been initiated from that runway and that the runway is clear for the contemplated landing maneuver.

When the clearance has been obtained for the airplane 111 to descend, the pilot of that airplane is instructed to initiate his descent. When he reports leaving his 1000 ft. altitude, the token for that airplane is moved to the next lower jack in the row of jacks corresponding to the computer unit that has been used in computing the landing maneuver, and thus the 1000 ft. altitude is left vacant for the descent of the airplane 112 which can be instructed to initiate its descent at this time. When the airplane 112 has reported as initiating its descent, the token for this airplane is moved into the 1000 ft. position, and the 1500 ft. altitude is then without a token jack so that clearance can be obtained for the descent of the airplane 113 to the 1500 ft. altitude. The 2000 ft. altitude is then vacated so that another airplane can be moved into the altitude from one of the outer stacks by a mode of operation which has been heretofore described. It will be noted that the laddering down of the airplanes in the inner stack can be accomplished irrespective of the position of the airplane in either the holding stack or a holding loop, the principal requisite being only that the next lower altitude has been vacated.

The particular mode of operation that has been described in the laddering down and landing of airplanes at an airport has been particularly involved in laddering down the airplanes in the outer stacks to the 3000 ft. altitude, and then transferring the flights to an inner stack for laddering down through the 2000, 1500 and 1000 ft. altitudes. For a disclosure of the specific circuits involved in this mode of operation, the Figs. 4 and 5 which are circuits for a typical altitude have been particularly adapted for the lower 1000, 1500 and 2000 foot altitudes so as to particularly illustrate how the circuits are organized where a plurality of token jacks are provided for a single altitude.

It is to be understood, however, that as required in practice there may be conditions where it is desirable to bring an airplane into the inner stack at a higher altitude, and thus the system is so organized as to provide means for obtaining clearances for all flight altitudes in both the outer and inner stacks in order to satisfy all conditions that may arise in the practice of the invention. This is indicated by the panels of the board X as illustrated in Fig. 2 wherein buttons, jacks and indicator lamps are provided for all flight altitudes. Inasmuch as only one token jack is provided for each of the higher altitudes in the inner stack c that is not involved in computer landing maneuvers, it is to be understood that the circuit organization for each of these altitudes is as shown in Figs. 4 and 5 for the respective boards X and Y, except that the contacts associated with two of the token jacks in the circuits for the relays XC—C and XC—L associated with the board X, and the relays YC—C and YC—L associated with the board Y, are omitted. Under these conditions the contacts 48 and 49 can be omitted in the circuit for the relay XC—L (see Fig. 4) and energy can be applied directly to the contact 28 which would be assumed to be on the single token jack for the particular flight altitude under consideration. Similarly in the circuit for the relay XC—C, only the contact 90 of the token jack XTJ—C1 would be required, connection being made directly to the normally closed contact point of this jack from the back contact 89 of the relay AR—L. It is to be understood that the typical circuits illustrated in Figs. 4 and 5 as being associated with a typical flight altitude of the outer holding stacks a and b are applicable as shown for any of the flight altitudes for which the buttons, indicator lamps and jacks are provided on the boards X and Y.

*Interlocks*

Interlocking of circuits according to this embodiment of the present invention has been in general described when considering the respective typical modes of operation of the system, these interlocks being of two general classes. One of the classes of interlocks involves the interlock between respective boards for obtaining clearances. Such interlock will be readily recognized as being more or less fundamentally desirable in any type of an approach landing system of the general character described, it being desirable that only one board obtain clearance for an airplane at a particular altitude in a particular stack. It has thus been described that for the stack a, for example, a yellow clearance light can be obtained for an unoccupied altitude by actuation of the clearance button for that altitude on panel A of board X, A of board Y, or TA of board T, this clearance light being obtained for the particular controller first actuating the clearance button for that altitude and stack.

The other interlocks that have been described more particularly relate to interlocking the corresponding flight altitudes of the respective outer and inner stacks because of the proximity of these stacks making it unsafe for their simultaneous occupancy. It is to be understood that these interlocks are provided particularly in accordance with the specific embodiment illustrated in Fig. 10, and that the present invention contemplates the spacing of the respective outer and inner stacks from each other sufficiently for simultaneous occupancy of the same flight altitude in all stacks under conditions where such spacing can be accomplished. Under such conditions, those parts of the circuits involving interlocks to prevent conflicts at the same altitude are deleted. It is also to be understood that a greater or lesser number of holding stacks of varying configuration and location may be employed according to the requirements of practice, various modifications being made as required to the specific embodiment herein disclosed.

It will be readily apparent that the part of the organization having to do with facilitating the transfer of authority for supervision of airplane flights from the airways controllers to the approach controllers is fundamentally independent of whether or not there are interlocks between the respective outer and inner stacks, and substantially independent of the particular landing procedure that is employed in obtaining even spacing for the landing of airplanes from the inner stack. It is thus to be understood that modifications of the circuit organization disclosed in this embodiment of the present invention may be employed in accordance with varying requirements of practice relative to the time and place to which transfer of supervisory authority of the airplane flights from the airways to the approach controllers can be effected. It is thus to be understood, for example, that if the density of traffic warrants it, additional holding stacks may be employed more remote from the airport than the outer stacks illustrated, and the transfer of authority for supervision of the airplane flights may be made in these stacks or at other spaced points along the airways in accordance with the requirements of practice.

Having thus described an approach control landing system for a particular airport as one specific embodiment of the present invention, it is desired to be understood that this embodiment has been described more particularly to illustrate the mode of operation and the principles involved rather than to limit the scope of the present invention. It is thus to be understood that various adaptations, alterations and modifications may be applied to the specific embodiment herein disclosed in accordance with the requirements of practice to an extent permitted by the scope of the appending claims.

What I claim is:

1. An approach control system for governing airplane approaches to an airport at respective flight altitudes wherein supervision of flights of airplanes is transferred from an airways controlled at one station to an approach controller at a remote station as respective airplanes approach the airport comprising in combination, control boards in the respective stations, each of said control boards having manually operable means and an indicator lamp for each flight altitude disposed thereon at positions on the board comparable to the respective flight altitudes, two line circuits connecting the two stations for each flight altitude, a relay at each station for each flight altitude, circuit means including one of said line circuits for normally energizing said relay at said one station from said remote station, circuit means including the other of said line circuits for normally energizing said relay at said remote station from said one station, circuit means at each of the stations effective in response to actuation of said manually operable means for a selected flight altitude for deenergizing said line circuit that is normally energized at that station for that flight altitude, and means for energizing said indicator for a selected flight altitude in response to the designation of that flight altitude by the actuation of said manually operable means at that station for that altitude only provided that energy is fed through one of said line circuits for that flight altitude from the other station.

2. An approach control system for airplanes approaching an airport at respective assigned flight altitudes wherein supervision of the respective flights is transferred from the authority of an airways controller at one station to an approach controller at a remote station, a control panel at each of said stations, said control panel having manually operable means and an indicator disposed thereon for each flight altitude, two line circuits for each flight altitude extending between said stations, one of said line circuits being normally energized from one station and the other of said line circuits being normally energized from the other station, indication control means for each of said indicators effective to render that indicator energized in response to the actutaion of said manually operable means at that station for that flight altitude only provided that energy is fed over one of said line circuits from the other station, and means at each station responsive to the actuation of said manually operable means for deenergizing said line circuit for that flight altitude extending to the other station and thereby prevent the other station from obtaining clearance in response to the actuation of said manually operable means at that station for that flight altitude.

3. An air traffic control system for coordinating the supervision of airplane flights at two remotely spaced stations comprising in combination, a flight progress board at each of the stations having manually operable means for designation of a flight altitude and a normally deenergized indicator for that flight altitude, two normally energized line circuits connecting said stations, one of said line circuits being energized by one station, and the other being energized by the other station, circuit means responsive to the actuation of said manually operable means at either station for designation of a flight altitude for energizing said indicator at that station only provided that energy is fed over one of said line circuits from the other station, and circuit means at each of said stations responsive to the actuation of said manually operable means at that station for deenergizing one of said line circuits and thereby preventing the energization of said indicator at the other station in response to the actuation of said manually operable means at said other station.

4. An air traffic control system for coordinating the supervision of airplane flights by respective airways and approach controllers located at remotely spaced stations comprising in combination, a control board at each station having manually operable means for designating a flight altitude and an indicator for indicating clearance for the flight altitude designated, two normally energized line circuits connecting the two remotely spaced stations, one of said line circuits being normally energized at one station and the other of said line circuits being normally energized at the other station, circuit means responsive to the actuation of said manually operable means at one station for energizing said indicator at that station, said circuit means being effective only provided that energy is fed over one of said line circuits from the other station, and said circuit means being effective to deenergize the other of said line circuits, and circuit means at one of said stations effective in response to the actuation of said manually operable means at that station to energize the one of said line circuits that has been deenergized by prior actuation of said manually operable means at the other station and thereby change the character of energization of said indicator at the other station.

5. An approach control system for airplanes in approach of an airport wherein the airplanes are held in a stack at separate flight altitudes prior to landing comprising in combination, airways and approach controllers' boards in respective offices located remote from each other, each of said boards having manually operable means for preempting a given flight altitude of said stack and indication means for said given flight altitude having at least three distinctive indicating conditions, said board at the approach controllers' office having means for designating occupancy of said given altitude in said stack, two normally energized line circuits connecting the respective offices, one of said line circuits being normally energized at one office and the other at the other office, indication control means including said control wires for rendering said indication means on the approach controllers' board effective to provide a first distinctive indication in response to actuation of said manually operable means at the airways controllers' office for preempting said flight altitude, said means being effective to cause said indication means at the airways controllers' office to provide a first distinctive indication, and said indication control means being effective in response to the actuation of said manually operable means at the approach controllers' office subsequent to the actuation of the corresponding means at the airways controllers' office to change the indication of said indication means at the airways controllers' office from said first distinctive indication to a second distinctive indication, and indication control means responsive to said means for designating occupancy for changing the indication of said indication control means at the approach controllers' office from said first indication to a second distinctive indication and changing the indication of said indication means at the airways controllers' office from said second distinctive indication to a third distinctive indication.

6. In an approach control system for an airport wherein airplanes are held at separate flight altitudes in a stack prior to landing, in combination, airways and approach controllers' boards in respective offices located remote from each other, each of said boards having manually operable means for preempting a given flight altitude of said stack, and each of said boards having respective clearance and occupancy indicators for that flight altitude, said board at the approach controllers' office having means for designating occupancy of said given altitude in said stack, two normally energized line circuits connecting the respective offices, indication control means including said line circuits for intermittently energizing said occupancy indicator on the approach controllers' board in response to actuation of said manually operable means at the airways controllers' office for preempting said flight altitude, said indication control means being effective to steadily energize said clearance indicator at the airways controllers' office in response to the actuation of said manually operable means at that office, and said indication control means being effective in response to the actuation of said manually operable means at the approach controllers' office subsequent to the actuation of the corresponding means at the airways controllers' office to intermittently energize said occupancy indicator at the airways controllers' office and deenergize said clearance indicator at that office, and occupancy indication control means responsive to said means for designating occupancy for steadily energizing said occupancy indicator on each board and rendering the intermittent energization of that occupancy indicator ineffective.

7. An approach control system of the character described wherein indications are provided as to a transfer of supervisory authority for an airplane at a particular flight altitude from an airways controller to an approach controller comprising in combination, manually operable means for said flight altitude at respective airways and approach controllers' offices located remotely from each other, indicator means for said flight altitude at the airways and approach controllers' offices, said indicator means being operable to provide a plurality of distinctive indicating conditions, means at the approach controllers' office for designating occupancy of said flight altitude, two normally energized line circuits connecting said offices, indicator control means including both of said line circuits effective to render a first distinctive indication effective for said indicator means at both offices in response to actuation of said manually operable means at the airways controllers' office, said indicator control means being effective to render a second distinctive indication effective for said indicator means at the airways office in response to actuation of said manually operable means at the approach controllers' office, said indicator control means being effective to render a third distinctive indication effective for said indicator means at the airways controllers' office and a second distinctive indication effective for said indicator means at the approach controllers' office in response to the designation of occupancy of said flight altitude at the approach controllers' office, and interlocking circuit means rendering said first distinctive indication ineffective if said flight altitude has been designated as being occupied by an airplane.

8. An approach control system for airplanes in approach to a runway comprising in combination; a plurality of marker beacons spaced from each other in longitudinal alignment with the runway at one end thereof marking the limits of each of two adjoining holding stacks, one of said beacons being common to both stacks; a control board having a clearance button, a clearance indicator, an occupancy indicator, and occupancy designation means disposed thereon for each stack for a particular flight altitude; clearance indication control means responsive to the actuation of said clearance button for either of said stacks for energizing said clearance indicator for that stack only provided that said clearance button for the adjoining stack for that flight altitude has not been actuated; and occupancy indication control means responsive to the designation of occupancy at said particular flight altitude in either of said adjoining stacks for energizing said occupancy indicator for both adjoining stacks.

9. A system for governing the approach of airplanes to a runway comprising in combination; a plurality of spaced markers at one end of the runway marking the limits of respective inner and outer holding patterns; clearance and occupancy designation and indication apparatus for each of said patterns disposed on a control board for a particular flight altitude comprising manually operable clearance designation means, manually operable occupancy designation means, a clearance indicator and an occupancy indicator; clearance indication control means for said clearance indicator for energizing that indicator in response to the manual designation of a clearance for that stack and for said altitude, said clearance indication control means being effective only provided that said occupancy designation means for that flight altitude has not been actuated; and occupancy indication control means for said occupancy indicator for each of said patterns for energizing that indicator in response to the designation of occupancy of either of said stacks at said altitude.

10. In a system of the character described for governing the approach of airplanes to a runway, in combination; a plurality of spaced markers at one end of the runway marking limits of respective adjoining outer and inner holding stacks; clearance and occupancy designation and indication apparatus disposed on a control board for a particular flight altitude comprising manually operable clearance designation means, manually operable occupancy designation means, a clearance indicator, and an occupancy indicator; occupancy indication control means for said occupancy indicator for energizing that indicator in response to designation of occupancy of either of said stacks for said altitude; and clearance indication control means for said clearance indicator for energizing that indicator in response to the manual designation of a clearance for that stack and for that altitude, said clearance indication control means being effective in response to designation of a clearance for only a single stack only provided that said occupancy designation means has not been actuated for either stack for that altitude, but said clearance indication control means being effective for energizing said clearance indicator for said inner stack at a time when said occupancy indicator for that stack is energized provided that said manually operable designation means is simultaneously actuated for the outer stack at that altitude.

11. An approach control system for airplanes in approach to a runway comprising in combination; a plurality of marker beacons spaced from each other in longitudinal alignment with the runway at each end thereof, the beacons at each end of the runway marking the flight pattern of adjoining inner and outer holding stacks; a control board having a clearance button, a clearance indicator, an occupancy indicator, and occupancy designation means for a given flight altitude disposed thereon for said inner stacks and for each of said outer stacks; clearance indication control means responsive to the actuation of said clearance button for said inner stacks or for either of said outer stacks for energizing said clearance indicator for the associated stack; occupancy indication control means responsive to the designation of occupancy by an airplane at said given flight altitude in either of said inner stacks for energizing said occupancy indicator for said inner stacks and for energizing said occupancy indicator for each of said outer stacks for said given flight altitude; and interlocking means rendering said clearance indication control means inactive for both of the outer stacks for said given flight altitude if occupancy has been designated for an airplane in either of the inner stacks at that flight altitude.

12. In an approach control system for governing the approach of airplanes to a runway, in combination; a plurality of marker beacons spaced from each other in longitudinal alignment with the runway at each end thereof, the beacons at each end of the runway being effective to mark the limits of adjoining inner and outer holding stacks; a control board having manually operable clearance designation means, a clearance indicator, an occupancy indicator, and occupancy designation means for a given flight altitude disposed thereon for said inner stacks and for each of said outer stacks; clearance indication control means responsive to the actuation of said clearance button for said inner stacks or for either of said outer stacks for energizing said clearance indicator for that stack; occupancy indication control means responsive to the designation of occupancy at said given flight altitude in either of said outer stacks for energizing said occupancy indicator for the associated outer stack and for said inner stacks for that flight altitude; and interlocking means rendering said clearance indication control means inactive for said inner stacks if occupancy has been designated for that flight altitude for either of said outer stacks.

NELSON B. COLEY.

REFERENCES CITED

The following references are of record in the file of this patent:

UNITED STATES PATENTS

| Number | Name | Date |
|---|---|---|
| 1,575,599 | Hornberger | Mar. 2, 1926 |
| 2,268,240 | Brixner | Dec. 30, 1941 |
| 2,344,759 | Wight | Mar. 21, 1944 |
| 2,344,760 | Wight | Mar. 21, 1944 |
| 2,425,973 | Wight | Aug. 19, 1947 |